United States Patent
Xue et al.

(10) Patent No.: US 10,523,127 B1
(45) Date of Patent: Dec. 31, 2019

(54) OUTPUT CLAMPED FLYBACK CONVERTER

(71) Applicant: NAVITAS SEMICONDUCTOR, INC., El Segundo, CA (US)

(72) Inventors: Lingxiao Xue, Los Angeles, CA (US); Jason Ju Zhang, Monterey Park, CA (US)

(73) Assignee: Navitas Semiconductor, Inc., El Segundo, CA (US)

( * ) Notice: Subject to any disclaimer, the term of this patent is extended or adjusted under 35 U.S.C. 154(b) by 0 days.

(21) Appl. No.: 16/399,965

(22) Filed: Apr. 30, 2019

(51) Int. Cl.
*H02M 3/335* (2006.01)
*H02M 1/08* (2006.01)
*H02M 1/00* (2006.01)

(52) U.S. Cl.
CPC ....... *H02M 3/33592* (2013.01); *H02M 1/083* (2013.01); *H02M 2001/0058* (2013.01)

(58) Field of Classification Search
CPC ............. H02M 3/33592; H02M 1/083; H02M 2001/0058
See application file for complete search history.

(56) References Cited

U.S. PATENT DOCUMENTS

| | | | |
|---|---|---|---|
| 2014/0103860 A1* | 4/2014 | Kominami | H02M 1/32 320/103 |
| 2015/0180325 A1* | 6/2015 | Liang | H02M 3/33546 363/21.09 |
| 2015/0381075 A1* | 12/2015 | Qu | H02M 3/33576 363/132 |
| 2018/0115247 A1* | 4/2018 | Schekulin | H02M 1/32 |

* cited by examiner

*Primary Examiner* — Kyle J Moody
(74) *Attorney, Agent, or Firm* — Kilpatrick Townsend & Stockton LLP

(57) ABSTRACT

A converter circuit is disclosed. The converter circuit includes a transformer and a primary circuit connected to the primary side of the transformer, where the primary circuit includes a first switch connected to a ground. The converter circuit also includes a second switch connected to the first switch, and a clamping capacitor connected to the second switch and to the input. The converter circuit also includes a secondary circuit connected to the secondary side of the transformer, where the secondary circuit includes a secondary capacitor, an inductor, and a bypass element in parallel with the inductor.

20 Claims, 17 Drawing Sheets

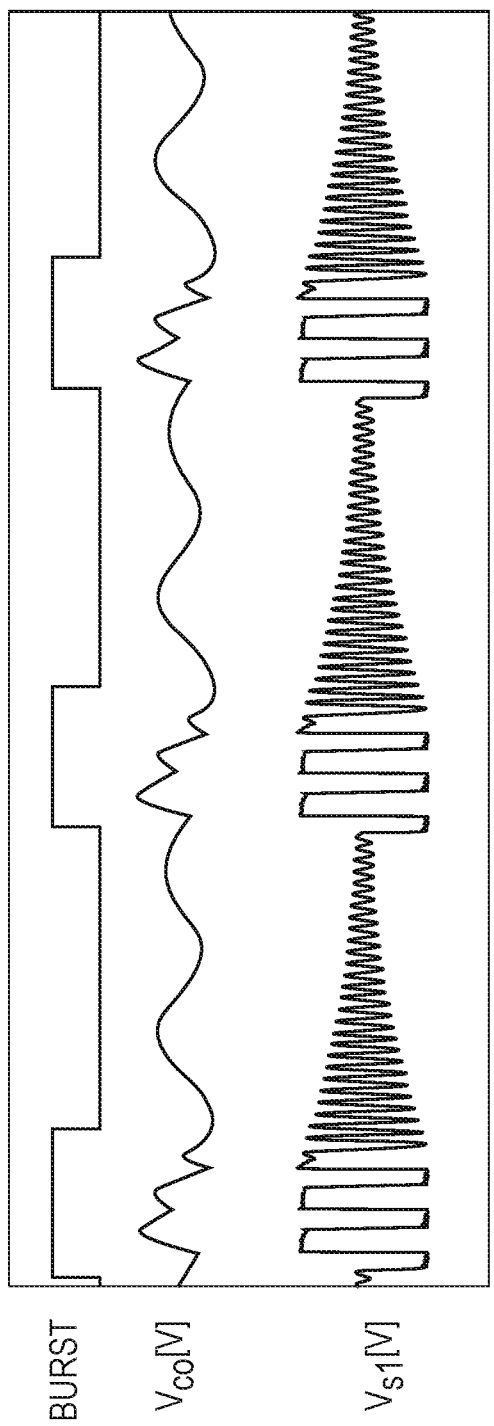 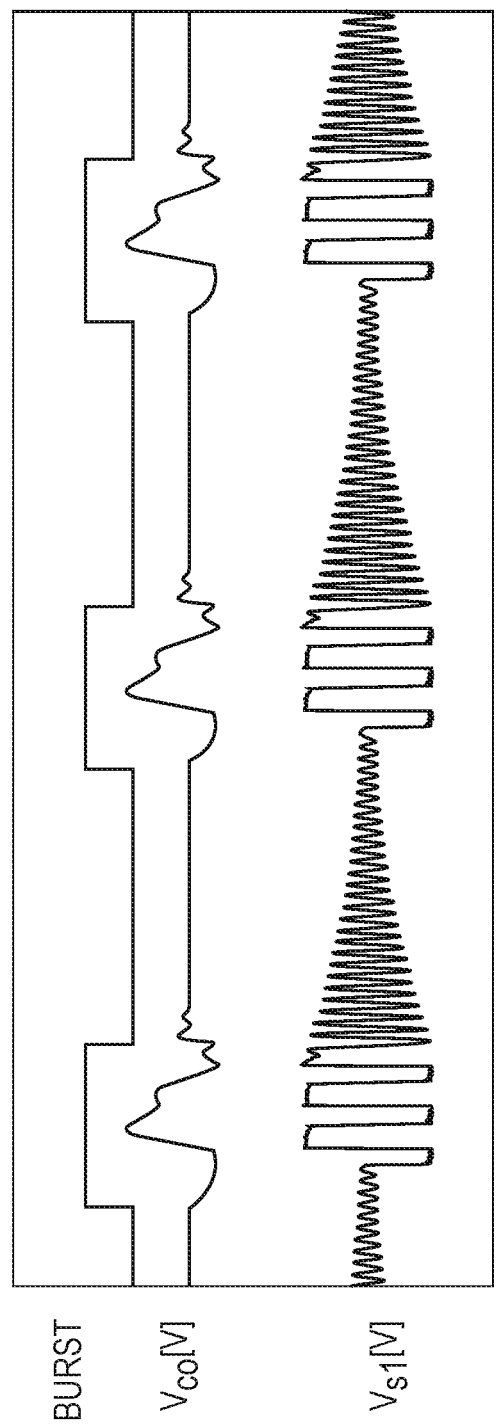

OUTPUT CLAMPED FLYBACK CONVERTER

CROSS-REFERENCES TO RELATED APPLICATIONS

Field of the Invention

The present application generally pertains to flyback converters, and more particularly to flyback converters having resonance significantly affected by the output capacitor.

Background of the Invention

Single-switch flyback converter topologies are popular in many applications. In this category, quasi-resonant flyback can reduce switching loss by means of resonant operation. However, the transformer leakage energy is not recovered and clamps are needed to protect primary and secondary switches. In addition, QR flyback typically operates below 150 kHz to minimize switching losses and EMI.

FIG. 1 is a schematic illustration of a traditional active clamp flyback (ACF) converter with a secondary diode-rectifier. Lm represents the transformer magnetizing inductance, and Lr can be the leakage inductance of the transformer or the leakage inductance of the transformer in series with a discrete inductor. Capacitor Cr is the clamping capacitor and S2 is the clamping switch. S1 is same switch as traditional single-switch flyback has. D1 is the rectifier diode that conducts current to the load. In some embodiments rectifier diode D1 is a P-N junction diode. In alternative embodiments, rectifier diode D1 is a FET having a gate terminal electrically connected with a drain terminal, as understood by those of skill in the art. Co is used to filter the switching ripple of the output voltage and has big capacitance.

The switches of the converter of FIG. 1, as well as the other converters discussed herein are driven with a controller (not shown) programmed to cause the converter to generate a voltage across the output capacitor Co using energy from an input at the node shared by capacitor Cr and inductor Lr.

Active clamp flyback (ACF) is a two-switch topology that achieves soft switching and recovers leakage inductance energy. Continuous conduction mode (CCM) active clamp flyback, such as that shown in FIG. 1, has positive magnetizing current, and therefore has lower RMS current. However, this circuit requires an external inductor to achieve full ZVS. In addition, the secondary rectifier turn-off is hard switched.

FIG. 2 is a schematic illustration of a traditional discontinuous conduction mode (DCM) active clamp flyback (ACF) converter. In contrast to the converter of FIG. 1, the magnetizing current of discontinuous conduction mode ACF or critical conduction mode ACF of the converter illustrated in FIG. 2 swings to a negative level. This may achieve ZVS turn-on for the low-side switch and may make zero-current-switching (ZCS) turn-off of the rectifier device possible.

In order to reduce the conduction loss of the rectifier diode especially in applications with high output current, synchronous rectifier (SR) topology is often used, as illustrated in FIG. 2. The SR scheme may include, for example, turning on the SR switch S3 in response to a sensed current through or a sensed voltage across the SR switch S3 indicating that the body diode of SR switch S3 is conducting. The SR switch S3 can be a Si MOSFET or GaN HEMT and operates in the third-quadrant to bring down the voltage drop.

The SR switch is generally controlled to conduct when the body diode starts carrying current and to block when the body diode current drops to zero. Due to such factors as circuitry delay and parasitic effects, the SR switch S3 has a delayed turn-on and an early turn-off, depending on the SR controller performance and circuit parasitics. When the SR switch is turned off, its body diode starts diverting the remaining current. If the body diode still carries high current when the SR switch S3 is turned off, a reverse recovery process happens. As a result, the circuit experiences high loss, voltage ringing, and EMI noise. Therefore, the current is reduced as much as possible before the SR switch S3 is turned off. If the diode current is zero and consequently off, it is under zero-current-switching (ZCS) turn-off condition. Such operation generally has the benefits of low loss, low voltage ringing, and low EMI noise.

In order to analyze the ACF operation, the ACF topology with the switch output capacitance is redrawn in FIG. 3. The operating waveforms of a traditional ACF converter, such as that illustrated in FIG. 3, is shown in FIG. 4. The output capacitor Co is large in capacitance, as indicated by its symbol, and therefore can be treated as a constant voltage source when analyzing the circuit.

During the interval when switch S1 is in the on state, the magnetizing inductance is charged and its current (ILm=ILr) increases linearly. In addition, secondary current (Is3) is zero during the interval with switch S1 in the on state.

At the end of the interval with switch S1 in the on state, switch S1 is turned off and switch S2 is turned on. Due to the current dividing effect between the two primary capacitors Coss and the secondary capacitor Cj, the inductor current Lr quickly drops to a value (Idip) that is lower than the peak of the magnetizing current (ILm). Then, during the interval with switch S2 on (or S1 OFF interval), Lr resonates with clamping capacitor Cr and the difference between inductor Lr current (iLr) and magnetizing current iLm is delivered to the load (Is3). The inductor current can be solved as $$i_{Lr}(t) = I_{dip}\cos(\omega t) + \frac{nV_o - V_{Cr}(0)}{Z} \cdot \sin(\omega t) \qquad (1)$$

$$\omega = \frac{1}{\sqrt{C_r \cdot L_r}}, z = \sqrt{\frac{L_r}{C_r}} \qquad (2)$$

where Idip is the initial current of iLr before the resonant process; Vo is the output capacitor Co voltage and approximately equals to the output voltage of the transformer due to low voltage drop of SR switch S3; Vcr(0) is the initial voltage of the resonant capacitor Cr, which can be solved as (3) according to charge balance of resonant capacitor Cr.

$$V_r(0) = nV_o - \frac{I_{dip} \cdot \sqrt{\frac{L_r}{C_r}}}{\tan(\theta)}, \theta = \pi - \frac{(1-D) \cdot T_s}{2\sqrt{L_r C_r}} \qquad (3)$$

where D is the duty cycle of S1 and Ts is the switching period.

Because clamping capacitor Cr only has current during the switch S1 OFF interval, combining equations (1) and (2), and implementing the law of charge balance, shows that at the end of the switch S1 OFF interval, iLr is −Idip. If at the end of the switch S1 OFF interval iLr is more negative than the iLm minimum, then switch S3 current (ISR) is positive, as shown in FIG. 4(a). When switch S2 is turned off, switch S3 will be forced off at high current and its body diode will go through reverse recovery and cause various problems including voltage ringing, power loss, and EMI emission noise.

Reducing the clamping capacitor Cr capacitance shortens the resonant period, which makes iLr actually merge with iLm shortly, interrupting the resonance of Lr and Cr. By the end of the switch S1 OFF interval, it is possible that iLr equals or substantially equals iLm, achieving ZCS for the secondary switch S3, as shown in FIG. 4(b).

However, as indicated in FIG. 4(b), the current of synchronous rectification switch S3 ($i_{S3}$) is cut off temporarily during the switch S1 OFF interval. Accordingly, the SR controller needs to turn on and off the SR switch twice during this interval. Such operation increases driving loss and causes instability of the circuit operation.

A minimum conduction time of SR switch S3 can be programmed through the SR controller to avoid the multiple turn-on issue. However, the fixed minimum on-time causes operation anomaly at light load and impacts efficiency. In addition, the amplitude of the resonant current iLr is greater in FIG. 4(b) than that in FIG. 4(a). Such operation leads to greater RMS value and increases the conduction loss of switch S2 and the transformer winding.

In summary, to achieve ZCS of the secondary SR switch, existing ACF topology with primary resonant has the drawbacks of SR multiple turn-on and high RMS value of the primary current, which leads to poor SR control performance, high driving loss, high conduction loss, and low efficiency.

BRIEF SUMMARY OF THE INVENTION

In some embodiments, a converter circuit is disclosed. The converter circuit includes a transformer and a primary circuit connected to the primary side of the transformer, where the primary circuit includes a first switch connected to a ground. The converter circuit also includes a second switch connected to the first switch, and a clamping capacitor connected to the second switch and to the input. The converter circuit also includes a secondary circuit connected to the secondary side of the transformer, where the secondary circuit includes a secondary capacitor, an inductor, and a bypass element in parallel with the inductor.

BRIEF DESCRIPTION OF THE DRAWINGS

FIGS. 32A and 32B are waveform diagrams illustrating operation of a converter in burst mode without and with use of a clamping switch during the inactive time period.

DETAILED DESCRIPTION OF THE INVENTION

Particular embodiments of the invention are illustrated herein in conjunction with the drawings.

Various details are set forth herein as they relate to certain embodiments.

However, the invention can also be implemented in ways which are different from those described herein. Modifications can be made to the discussed embodiments by those skilled in the art without departing from the invention. Therefore, the invention is not limited to particular embodiments disclosed herein.

As discussed above, in conventional converters resonance is dominated by the clamping capacitor Cr. In embodiments discussed herein the output capacitor Co dominates or at least contributes significantly to the resonance of the converter.

Some embodiments of the present disclosure relate to power conversion circuits that improve the efficiency of and/or reduce the size of power adapters for electronic devices such as, for example, laptop computers. Some embodiments relate to active clamp flyback circuits with secondary resonance that allow soft switching under varied line and load conditions, recover leakage inductance and minimize snubber losses in the power conversion circuit. Some embodiments employ eMode GaN switches and an optimized active clamp flyback circuit to increase switching frequency while maintaining and/or improving efficiency. For example, in some embodiments, a magnetizing inductance of a transformer is used to achieve zero voltage switching turn-on for the primary side switches, and zero current turn-off switching for a secondary side synchronous rectification switch. As leakage inductance energy is recovered and the primary side switch voltage is clamped, the need for a snubber is minimized and the circuit can switch efficiently at high frequency.

Secondary-Resonant Scheme

Figure 5:
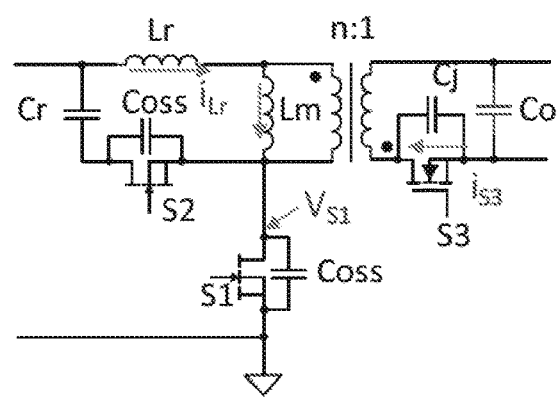
FIG. 5 is a schematic illustration of a converter with a secondary resonant capacitor according to some embodiments.

FIG. 5 is an secondary-resonant scheme, which uses a small-capacitance output capacitor Co as the resonant element. The voltage ripple across output capacitor Co will be high, so this topology can be used in applications where output voltage ripple across output capacitor Co can be tolerated. The output capacitor Co in this scheme can be a high-quality capacitor with low ESR and ESL for low loss. The clamping capacitor Cr in this case is a high-capacitance capacitor such that its voltage can be treated as a constant voltage source in analysis. Coss is the output capacitance of S2 and S1, and Cj is the output capacitance of S3.

Figure 6:
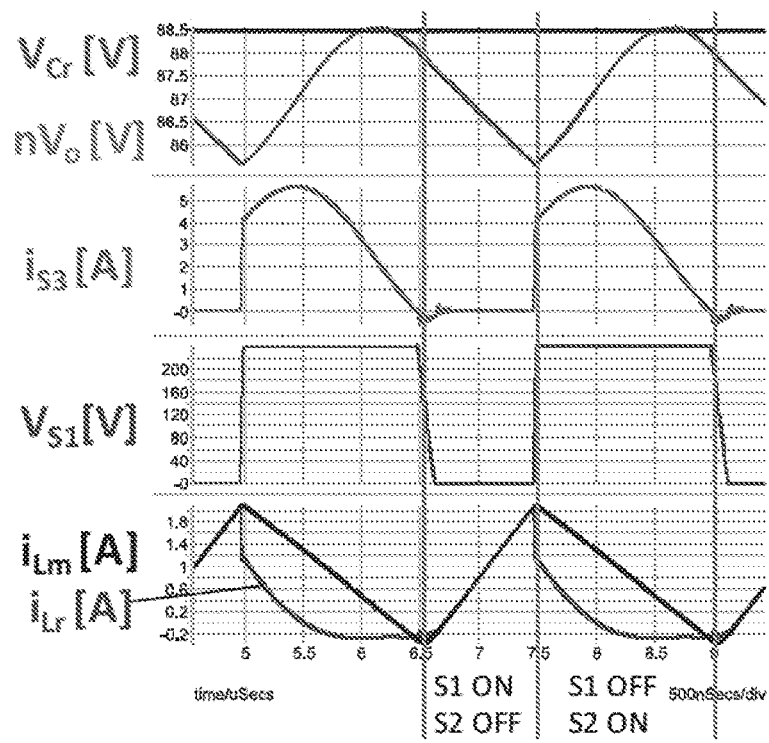
FIG. 6 is a waveform diagram showing operation of a converter with a secondary resonant capacitor according to some embodiments.

The secondary-resonant ACF waveforms generated during operation of the circuit of FIG. 5 are shown in FIG. 6. The operation during the switch S1 ON interval is the same as conventional ACF converter, such as that illustrated in FIG. 3. When switch S1 is turned off, the iLr current drops to a lower value due to the current dividing effect depending on the ratio of the primary switch Coss to the secondary switch output capacitance Cj. This current drop has the same or similar cause as that of a traditional ACF converter, such as that illustrated in FIG. 3. When the commutation of switches S1, S2, and S3 is completed, Lr starts to resonate with the output capacitor Co and clamping capacitor Cr.

Figure 7:
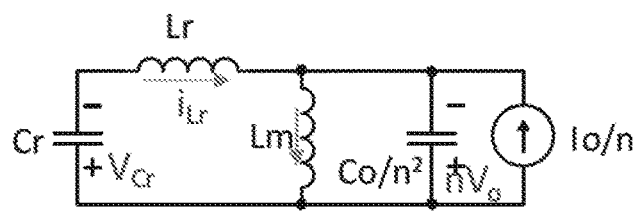
FIG. 7 is a schematic illustration of an equivalent circuit of the circuit of FIG. 6 during a switch S1 OFF interval.

FIG. 7 illustrates an equivalent circuit during the switch S1 ON interval, with the secondary components reflected to the primary side. Since clamping capacitor Cr has very large capacitance relative to the output capacitor Co, the resonance is dominated by output capacitor Co. Accordingly, this scheme is referred to as a secondary-resonant scheme. The inductor current iLr can be solved as $$i_{Lr}(t) = \left(\frac{nV_o}{\omega L_m} + \frac{nV_o(0) - V_r}{Z}\right) \cdot \sin(\omega t) - \quad (4)$$

-continued
$$\left(I_{pk} - \frac{I_o}{n} - I_{dip}\right) \cdot \cos(\omega t) + \left(I_{pk} - \frac{I_o}{n} - \frac{nV_o}{L_m} \cdot t\right)$$

$$\omega = \frac{1}{\sqrt{L_{lk} \cdot C_o/n^2}}, Z = \sqrt{\frac{L_{lk}}{C_o/n^2}} \quad (5)$$

where Vr is the voltage across clamping capacitor Cr, and is treated as constant. Vo is the average of output voltage, Ipk is peak value of the magnetizing current. Vo(0) is the initial voltage of the output capacitor Co, and the value of Vo(0) depends on when the iLr current equals the iLm current, and can be very complicated to calculate. In some embodiments, it is preferred to let the iLr current become equal to the iLm current as close as possible to the end of the switch S1 OFF interval, in order to minimize RMS current value and lower conduction loss. This may be determined, for example, using a simulator. Therefore, it is reasonable to assume that the iLr current becomes equal to the iLm current right at the end of the switch S1 OFF interval. Then Vo(0) can be solved with equation (6) by implementing charge balance of Cr.

$$nV_o(0) - V_r = \quad (6)$$

$$\frac{\left(I_{pk} - \frac{I_o}{n} - I_{dip}\right) \cdot Z \cdot \sin[\omega(1-D)T_s] - \omega DT_s I_o Z/n}{1 - \cos[\omega(1-D)T_s]} - \frac{nV_o L_k}{L_m}$$

By substituting equation (6) into the equation (4), the resonant inductor current iLr can be determined as $$i_{Lr}(t) \approx \frac{-\omega DT_s I_o/n}{1 - \cos[\omega \cdot (1-D)T_s]} \cdot \sin(\omega t) - \quad (7)$$

$$\left(I_{pk} - \frac{I_o}{n} - I_{dip}\right) \cdot \cos(\omega t) + \left(I_{pk} - \frac{I_o}{n} - \frac{nV_o}{L_m} \cdot t\right)$$

The derivative of equation (7) is $$\frac{di_{Lr}(t)}{dt} \approx \quad (8)$$

$$\frac{-\omega DT_s I_o/n}{1 - \cos[\omega \cdot (1-D)T_s]} \cdot \omega\cos(\omega t) + \left(I_{pk} - \frac{I_o}{n} - I_{dip}\right) \cdot \omega\sin(\omega t) - \frac{nV_o}{L_m}$$

Figure 1:
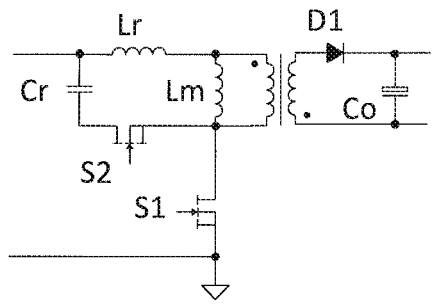
FIG. 1 is a schematic illustration of an Active Clamp Flyback converter with a diode rectifier.
Figure 2:
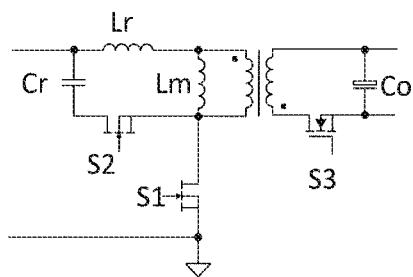
FIG. 2 is a schematic illustration of a converter with a synchronous rectifier.
Figure 3:
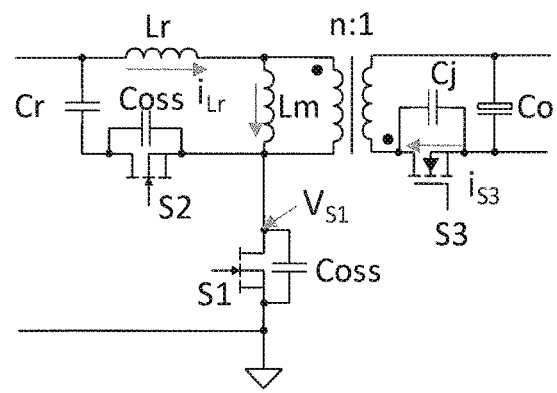
FIG. 3 is a schematic illustration of a converter showing parasitic capacitances.
Figure 4A:
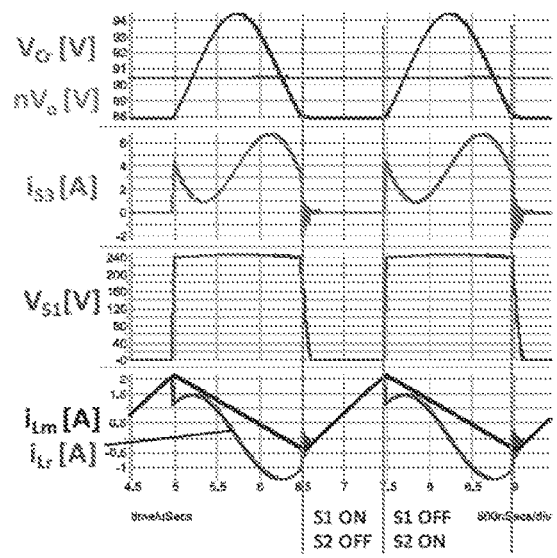
FIGS. 4A and 4B are waveform diagrams showing operation of a converter without secondary zero current switching (ZCS) (4A) and with secondary ZCS (4B) according to some embodiments.
Figure 4B:
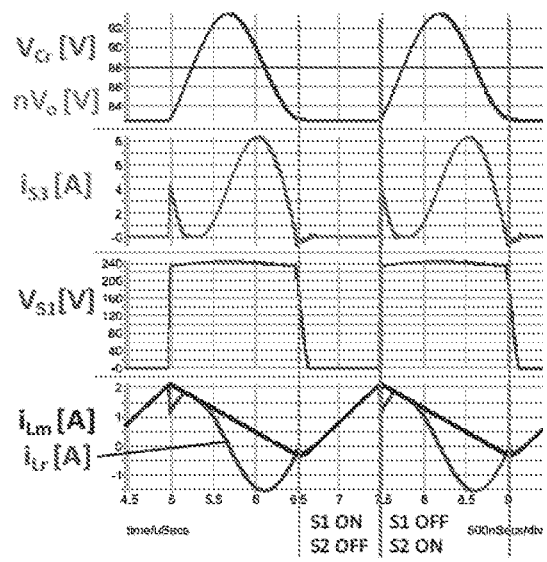

At t=0, the value of the derivative of the iLr current, as determined by equation (8), is always negative. Accordingly, the iLr current continues to decrease. Without resonating back to a more positive value, the iLr current is always less than the iLm current during the switch S1 OFF interval. Accordingly, in contrast to the operation of the primary-resonant circuit as illustrated in FIG. 3, the secondary switch S3 current iS3 of this embodiment, will not drop to zero twice during the switch S1 OFF interval regardless of voltage at the input, average voltage across the output capacitor, and average current through the rectifying switch. Accordingly, this secondary-resonant scheme eliminates the double-turn-on issue of the SR switch, achieves reliable SR controller operation, and improves ACF efficiency.

Figure 8:
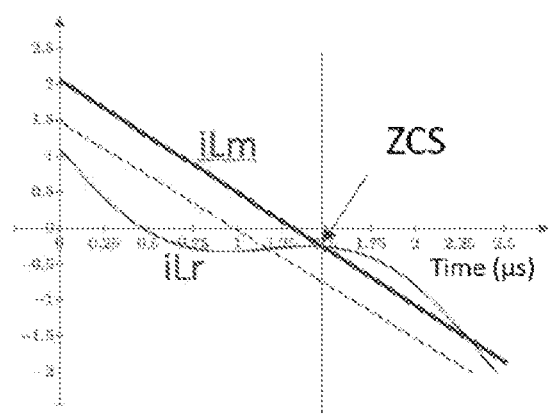
FIG. 8 is a plot of iLm and iLr according to some embodiments.

In equation (7), the last term is a linear-reducing function, and the first two terms constitute a resonant function superimposed on the linear-reducing function. Equation (7) is plotted in FIG. 8 with magnetizing current iLm. The dashed green line represents the linear reducing term in equation (7). The residence of the iLr current is centered around or superimposed on the linear decreasing term, such that the iLr current experiences a substantially flat or 0 derivative portion at the bottom, which is lower in RMS than that of the primary-resonant scheme, for example, as illustrated.

Figure 9:
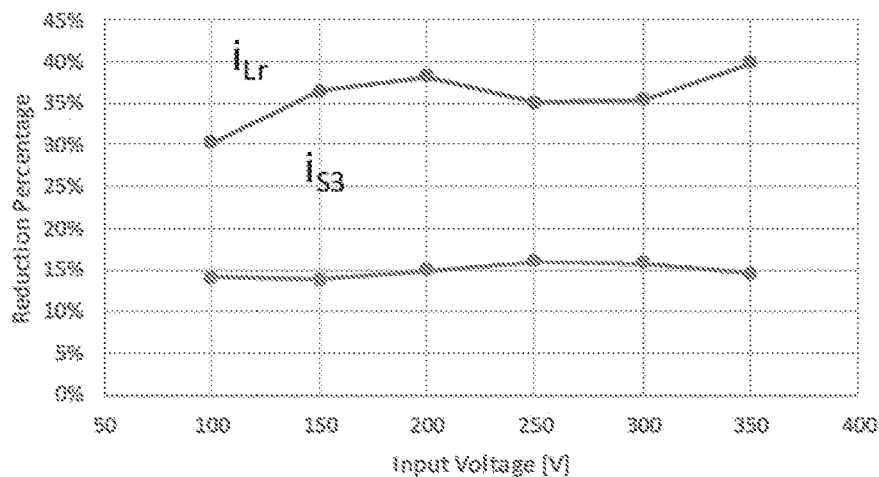
FIG. 9 is a graph showing RMS Current performance according to some embodiments.

Primary-resonant and secondary resonant schemes were simulated and RMS values of the resonant current iLr and the secondary SR current iS3 are compared. The simulation was performed with 150V input, 20V/2.25 A output, transformer turns ratio=4.3, Lr=900 nH. FIG. 9 illustrates plots of the RMS current reductions in the resonant current iLr and the secondary SR current iS3 achieved by using secondary-resonant scheme over the conventional primary-resonant scheme, as illustrated in FIG. 3. As indicated, the reduction of resonant current iLr is above 30% over a wide input voltage range, and the reduction of the secondary SR current iS3 is about 15% over the wide input voltage range. As understood by those of skill in the art, the RMS current savings directly translates into conduction loss reduction.

As a result, the secondary-resonant ACF scheme, for example as illustrated in FIG. 5, has more reliable ZCS performance without double-turn-on of the secondary SR switch, and has lower RMS current than the conventional primary-resonant scheme, as illustrated in FIG. 3.

Mixed-Resonant Scheme

If the capacitance of the clamping capacitor Cr is comparable to the capacitance of output capacitor Co/n2, both the clamping capacitor Cr and the output capacitor Co will have significant impact on the resonant process with inductor Lr. Since this scheme has both primary resonance and secondary resonance, it may be referred to as a mixed-resonant scheme. The equivalent circuit during the resonant process is same as that in FIG. 7.

The solution for the inductor Lr current (iLr) is obtained as $$i_{Lr}(t) = \left(\frac{nV_o k}{\omega L_m} + \frac{nV_o(0) - V_r(0)}{Z}\right) \cdot \sin(\omega t) - \quad (9)$$

$$\left(kI_{pk} - \frac{kI_o}{n} - I_{dip}\right) \cdot \cos(\omega t) + \left(I_{pk} - \frac{I_o}{n} - \frac{nV_o}{L_m} \cdot t\right) \cdot k$$

$$k = \frac{C_r}{C_o/n^2 + C_r}, \omega = \frac{1}{\sqrt{L_r \cdot k \cdot C_o/n^2}}, Z = \sqrt{\frac{L_r}{k \cdot C_o/n^2}} \quad (10)$$

The secondary-resonant is the special case of mixed-resonant scheme when k=1 where equations (9) and (10) collapse to equations (4) and (5), respectively.

In real circuits where k may approach 1, the effect of the clamping capacitor Cr on resonance is substantially zero. For example, in some embodiments, k>0.999, and the effect of the clamping capacitor Cr is substantially zero and the resonance is dominated by the capacitance of the output capacitor. For example, in some embodiments, k>0.99, and the effect of the clamping capacitor Cr is substantially zero and the resonance is dominated by the capacitance of the output capacitor. For example, in some embodiments, k>0.9, and the effect of the clamping capacitor Cr is substantially zero and the resonance is dominated by the capacitance of the output capacitor. For example, in some embodiments, k>0.1, and the effect of the clamping capacitor Cr is substantially zero and the resonance is dominated by the capacitance of the output capacitor. For example, in some embodiments, k>0.05, and the effect of the clamping capacitor Cr is substantially zero and the resonance is dominated by the capacitance of the output capacitor. For example, in some embodiments, k>0.025, and the effect of the clamping capacitor Cr is substantially zero and the resonance is dominated by the capacitance of the output capacitor.

In embodiments where the clamping capacitor Cr substantially effects circuit resonance, the resonant current will split between primary and secondary sides in a ratio dependent on k. Accordingly, the ratio between the capacitance of clamping capacitor Cr and output capacitor Co effects the distribution of the resonant current. Therefore, the waveform shape of the primary current iLr and the secondary current iS3 changes and impacts the RMS values of the primary current iLr and the secondary current iS3.

Figure 10:
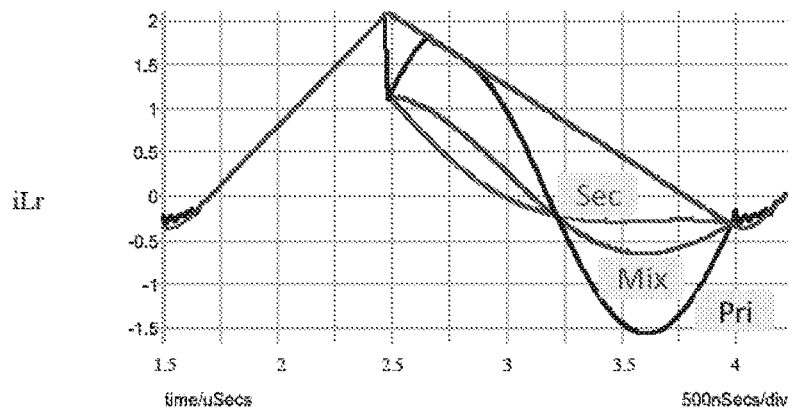
FIG. 10 is a plot of iLr for different schemes according to some embodiments.
Figure 11:
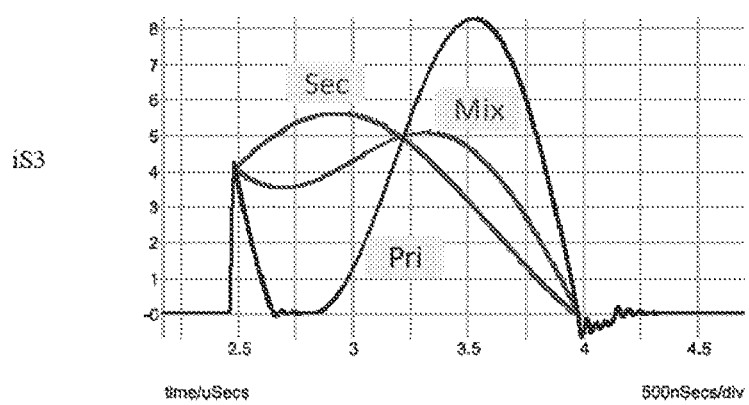
FIG. 11 is a plot of iS3 for different schemes according to some embodiments.
Figure 12:
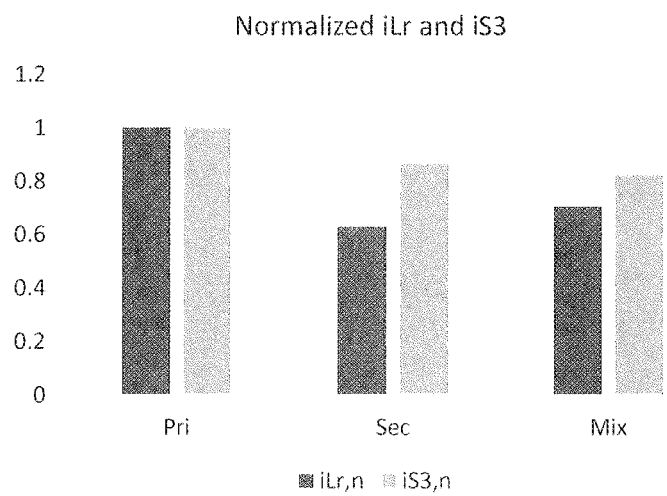
FIG. 12 is a graph comparing RMS current for different schemes according to some embodiments.

Simulation results comparing three different methods, namely, primary-resonant, secondary-resonant, and mixed primary-secondary resonant are shown in FIGS. 10 and 11. The primary inductor current iLr and the secondary rectifier switch current iS3 are plotted. The RMS current values using different resonant schemes are normalized to the RMS current with primary-resonant scheme and compared in FIG. 12. As shown, secondary-resonant and mixed-resonant have lower RMS values than primary-resonant has. While the secondary-resonant scheme shows lower inductor current than the mixed-resonant, it has higher rectifier switch current. The overall conduction loss depends on the resistances of primary and secondary sides. With fixed design of resistances, lowest overall conduction loss can be achieved by optimizing the current distribution using different Cr/Co ratio in mixed-resonant scheme.

In some embodiments, the capacitance value of the output capacitor Co is determined based on its effect on ZCS. Accordingly, to minimize ZCS the value of the output capacitor Co causes the iLr and the iLm currents to be substantially equal at the end of the switch S1 Off interval. In addition, the capacitance value of the clamping capacitor Cr causes the current of synchronous rectification switch S3 ($i_{s3}$) to remain on during the switch S1 OFF interval so that synchronous rectification may be used without turning on and off the SR switch twice during the switch S1 Off interval.

A metric for comparing embodiments of the primary resonant circuit, the secondary resonant circuit, and the mixed primary-secondary resonant circuit is an angular frequency defined by:

$$\omega_{C_o} = \frac{1}{\sqrt{L_r \cdot C_o/n^2}}$$

This angular frequency provides an indication of the contribution of the output capacitor Co to the resonance of the circuit.

For the primary resonant circuit, $\omega_{C_o}$ corresponds with a period which is much greater than the switch S1 Off time, as shown, for example, in FIG. 6. For example, the period corresponding with $\omega_{C_o}$ may be greater than 20 times the switch S1 Off time. In contrast, for the secondary resonant circuit and the mixed primary-secondary resonant circuit, the period corresponding with $\omega_{C_o}$ may, for example, be less than about 10 times the switch S1 Off time. In some embodiments of the secondary resonant circuit and the mixed primary-secondary resonant circuit, the period corresponding with $\omega_{C_o}$ may, for example, be less than about 10, 5, 4, 3, 2, 1.5, or 1.25 times the switch S1 Off time. In some embodiments of the secondary resonant circuit and the mixed primary-secondary resonant circuit, the period corresponding with $\omega_{C_o}$ may have another value.

Another metric for comparing embodiments of the primary resonant circuit, the secondary resonant circuit, and the mixed primary-secondary resonant circuit is a ratio of effective capacitances, defined by:

$$Creff = \frac{C_o/n^2}{C_r}$$

The ratio Creff provides an indication of the contribution of the output capacitor Co to the resonance of the circuit relative to the contribution of the clamping capacitor Cr to the resonance.

For the primary resonant circuit, the contribution of the output capacitor Co to the resonance of the circuit is negligible relative to the contribution of the clamping capacitor Cr. For example, in primary resonant circuits Creff may be greater than 50. In contrast, for the secondary resonant circuit and the mixed primary-secondary resonant circuit, Creff may be less than about 40. In some embodiments of the secondary resonant circuit and the mixed primary-secondary resonant circuit, Creff may be less than about 40, 30, 20, 10, 5, 4, 3, 2, 1, 0.5, 0.3, 0.25, 0.2, 0.15, 0.1, 0.05, 0.025, or 0.01, such that the effect of the clamping capacitor Cr is substantially zero and the resonance is dominated by the capacitance of the output capacitor. In some embodiments of the secondary resonant circuit and the mixed primary-secondary resonant circuit, Creff may have another value.

Another metric for comparing embodiments of the primary resonant circuit, the secondary resonant circuit, and the mixed primary-secondary resonant circuit is the output voltage ripple across output capacitor Co.

For the primary resonant circuit, ripple is reduced by using a large output capacitor Co. For example, in primary resonant circuits, the output voltage ripple may be less than 1%. In contrast, for the secondary resonant circuit and the mixed primary-secondary resonant circuit, the output voltage ripple and the output capacitor Co may be greater than about 2.5%. In some embodiments of the secondary resonant circuit and the mixed primary-secondary resonant circuit, the output voltage ripple across the output capacitor Co may be greater than about 4%, 5%, 6%, 7%, 8%, 9%, 10%, 11%, 12%, 13%, 14%, 15%. In some embodiments of the secondary resonant circuit and the mixed primary-secondary resonant circuit, the output voltage ripple across the output capacitor Co may have another value.

Topology Variants

The ACF output capacitor Co may be used as a resonant element in many different topologies.

FIG. 5 shows one implementation of this concept. In the embodiment of FIG. 5, the resonant capacitor directly feeds the load. In this embodiment, the load tolerates the voltage ripple across the output capacitor. In this topology, the clamping capacitor Cr can have different values in order to use secondary-resonant scheme or mixed-resonant scheme.

Figure 13:
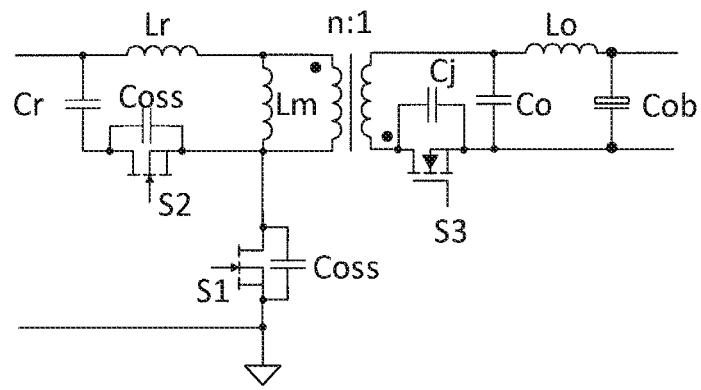
FIG. 13 is a schematic illustration of another embodiment of a converter.

In some embodiments, for example, if tight regulation on output voltage ripple is required, a filter, such as an additional LC filter stage can be added after the output capacitor Co, as shown in FIG. 13. Inductor Lo is the filter inductor and Cob is the filter capacitor.

Capacitor Cob can have very capacitance greater than the capacitance of the output capacitor Co. In some embodiments, capacitor Cob can has a capacitance greater than 1.5, 2, 5, 10, or 100 times the capacitance of the output capacitor Co.

An advantageous aspect of embodiments with the capacitance of capacitor Cob being significantly greater than the capacitance of output capacitor Co is that the circulating current experienced by the resonant output capacitor Co generates only low loss from the effective series resistance (ESR) of the resonant output capacitor Co. As understood by those of skill in the art, because of the LC filter, losses due to ESR are limited to the resonant output capacitor Co, which has a relatively low ESR. As a result, the large capacitor Cob provides the benefit of low output ripple without the cost of high ESR loss. And while the output capacitor Co may experience voltage ripple greater than what would be acceptable to a load, because of its low ESR as compared with the large capacitor Cob of the LC filter, the output capacitor Co generates relatively low ESR loss.

Figure 16:
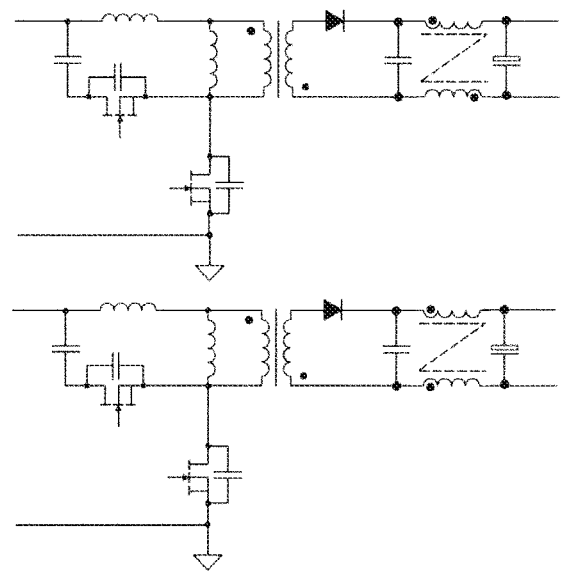
FIG. 16 is a schematic illustration of another embodiment of a converter.

In some embodiments, inductor Lo is a discrete inductor. In some embodiments, inductor Lo can be a leakage inductance of a common mode choke. For example, a n=1 transformer may be connected between the output capacitor Co and the large capacitor Cob such that the primary side of the transformer is connected between the output capacitor Co and the large capacitor Cob in the source path of current to a load and the secondary side of the transformer is connected between the output capacitor Co and the large capacitor Cob in the return path of current to from the load, for example, as illustrated in FIG. 16, discussed below.

In some embodiments, the corner frequency of the LC filter may be less than the resonant frequency of the circuit, as determined, for example, by w of equation 10.

As understood by those of skill in the art, the embodiment of FIG. 13 has features and operational characteristics which are similar or identical to those of the embodiment illustrated in FIG. 5.

Figure 14:
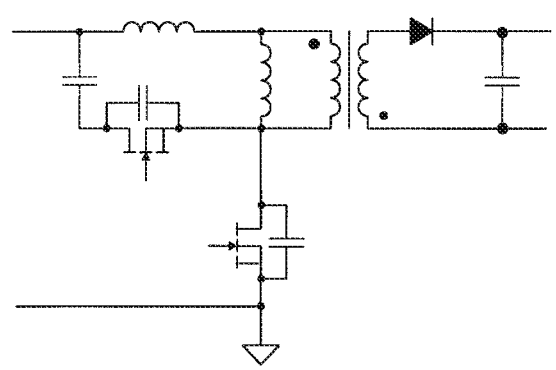
FIG. 14 is a schematic illustration of another embodiment of a converter.
Figure 15:
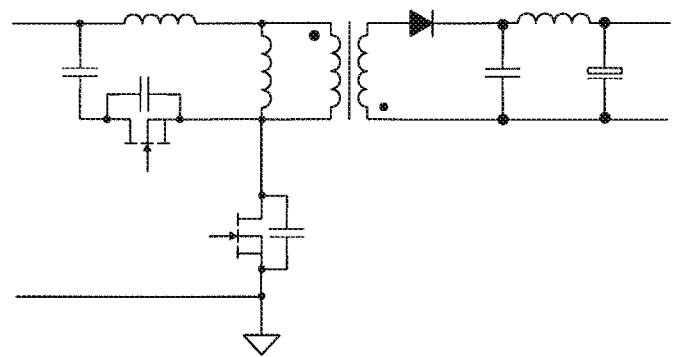
FIG. 15 is a schematic illustration of another embodiment of a converter.

In some embodiments, if a diode is used as the secondary rectifier instead of a SR switch, secondary-resonant and mixed-resonant scheme can be used to reduce the conduction loss and reduce reverse-recovery of the diode. Embodiments of this topology are shown in FIGS. 14, 15, and 16. The embodiments of FIG. 16, the inductor of the LC filter is formed by a leakage inductance of a common mode choke. As understood by those of skill in the art, the embodiments of FIGS. 14, 15, and 16 have features and operational characteristics which are similar or identical to those of the embodiments illustrated in FIGS. 5 and 13.

Figure 17:
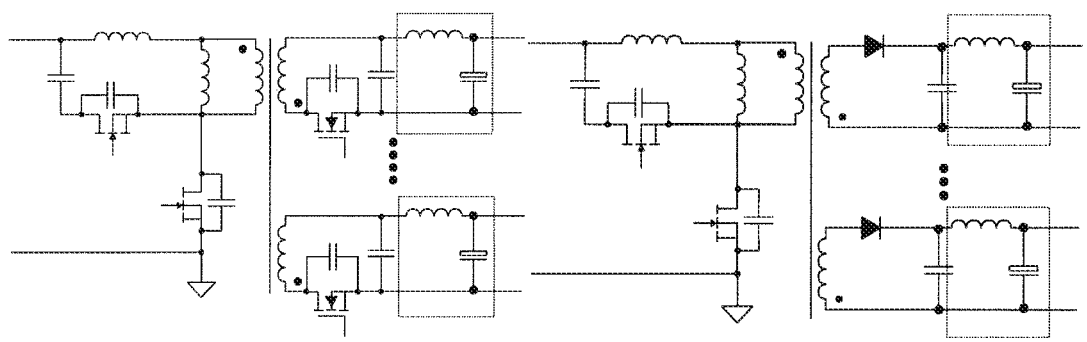
FIG. 17 is a schematic illustration of other embodiments of a converter.

FIG. 17 illustrates embodiments of a secondary-resonant or mixed-resonant scheme with multiple outputs. The output capacitors of one or more output branches can be used as resonant elements. The primary clamping capacitor can have different capacitance values in order to use secondary-resonant scheme or mixed-resonant scheme. LC filter stages are optionally used. Rectifier elements at the secondary side can be, for example, diodes, Si MOSFETs, GaN HEMTs, or other switches. As understood by those of skill in the art, the embodiment of FIG. 17 has features and operational characteristics which are similar or identical to those of the embodiments discussed elsewhere.

Figure 18A:
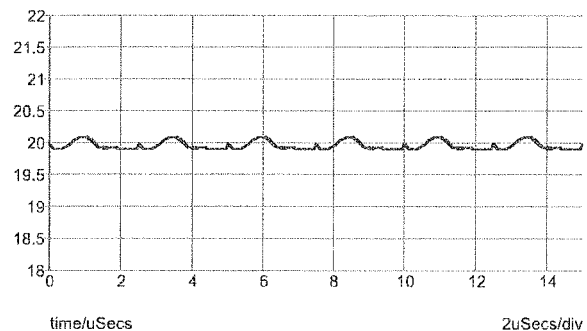
FIGS. 18A and 18B are plots illustrating output capacitor Co ripple for different schemes according to some embodiments.
Figure 18B:
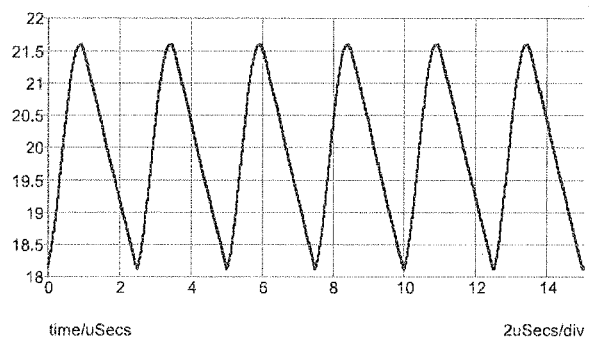
Figure 19:
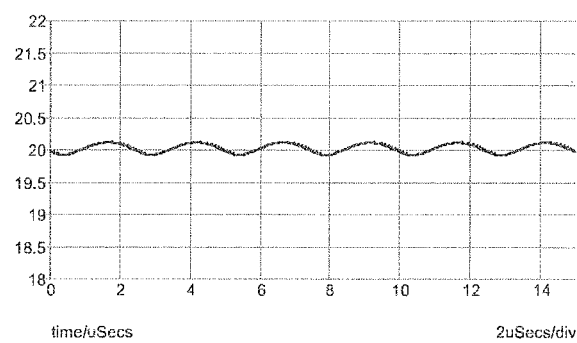
FIG. 19 is a plot illustrating filter capacitor Cob ripple for an embodiment with an LC filter.

FIGS. 18A, 18B and 19 illustrate simulation results comparing three different methods, namely, primary-resonant, secondary-resonant or mixed primary-secondary resonant with no LC filter, and secondary-resonant or mixed primary-secondary resonant with an LC filter. As illustrated, primary-resonant and secondary-resonant or mixed primary-secondary resonant with an LC filter topologies generate minimal ripple as compared with the topology with secondary-resonant or mixed primary-secondary resonant with no LC filter.

Figure 20:
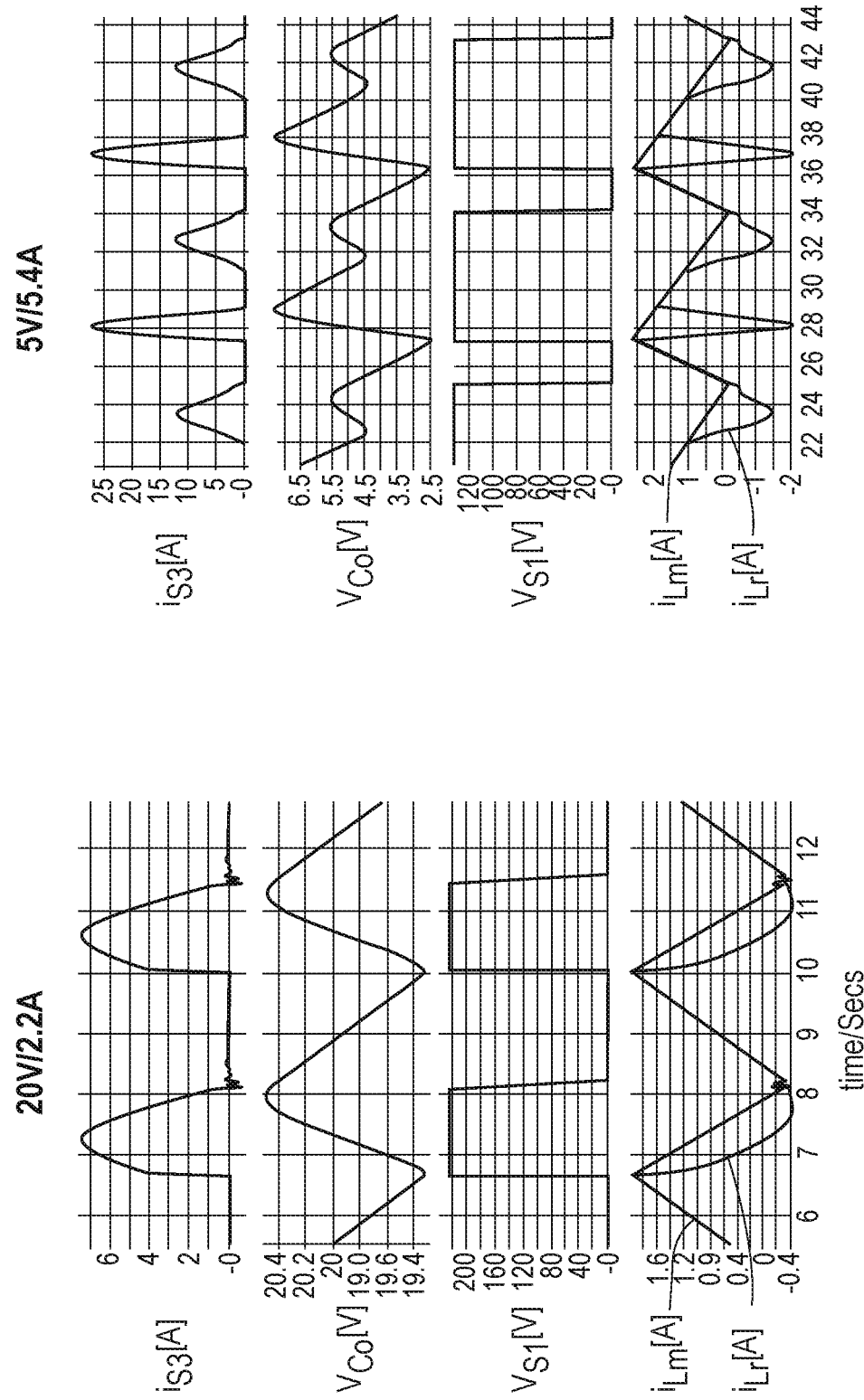
FIG. 20 is a set of waveform diagrams showing operation of a converter with a secondary resonant capacitor at two different output voltages according to some embodiments.

FIG. 20 is a set of waveform diagrams showing operation of a converter with a secondary resonant capacitor at two different output conditions according to some embodiments. As shown, for each of output conditions 20 V/2.2 A and 5 V/5.4 A, the waveforms show rectifier current ($i_{S3}$[A]), the voltage across the output capacitor Co ($V_{Co}$[V]), the switch node voltage ($V_{s1}$ [V]) across switch S1, the magnetizing current ($i_{Lm}$[A]), and the inductor current ($i_{Lr}$[A]).

As shown in FIG. 20, at output condition 5 V/5.4 A, the rectification switch S3 turns on twice during each period. As understood by those of skill in the art, the rectification switch needing to turn on twice during each period for some output conditions causes serious complications for circuitry used to control the rectification switch S3.

In addition, the voltage ripple in the voltage across the output capacitor ($V_{Co}$[V]) at output condition 5 V/5.4 A is much greater than the voltage ripple in the voltage across the output capacitor ($V_{Co}$[V]) at output condition 20 V/2.2 A. As understood by those of skill in the art, the voltage ripple in the voltage across the output capacitor Co causes a power loss, and may additionally cause unstable operation.

At least to increase the output condition range over which the circuit performs well, the voltage across the output capacitor Co ($V_{Co}$[V]) may be clamped to the voltage across the filter capacitor Cob.

Figure 21:
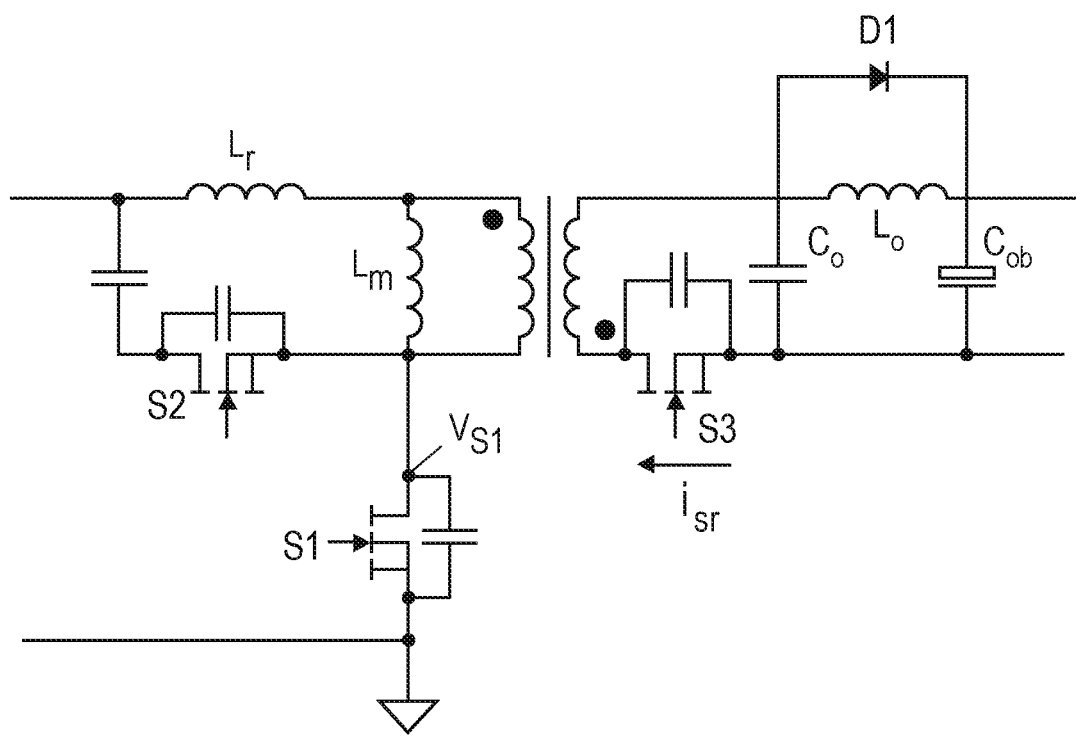
FIG. 21 is a schematic illustration of another embodiment of a converter.

FIG. 21 is a schematic illustration of an embodiment of a converter where the voltage across the output capacitor Co is clamped to the voltage across the filter capacitor Cob. The output capacitor Co in this embodiment can be a high-quality capacitor with low ESR and ESL for low loss. The clamping capacitor Cr in this case is a high-capacitance capacitor such that its voltage can be treated as a constant voltage source in analysis. Coss is the output capacitance of S2 and S1, and Cj is the output capacitance of S3.

Figure 22:
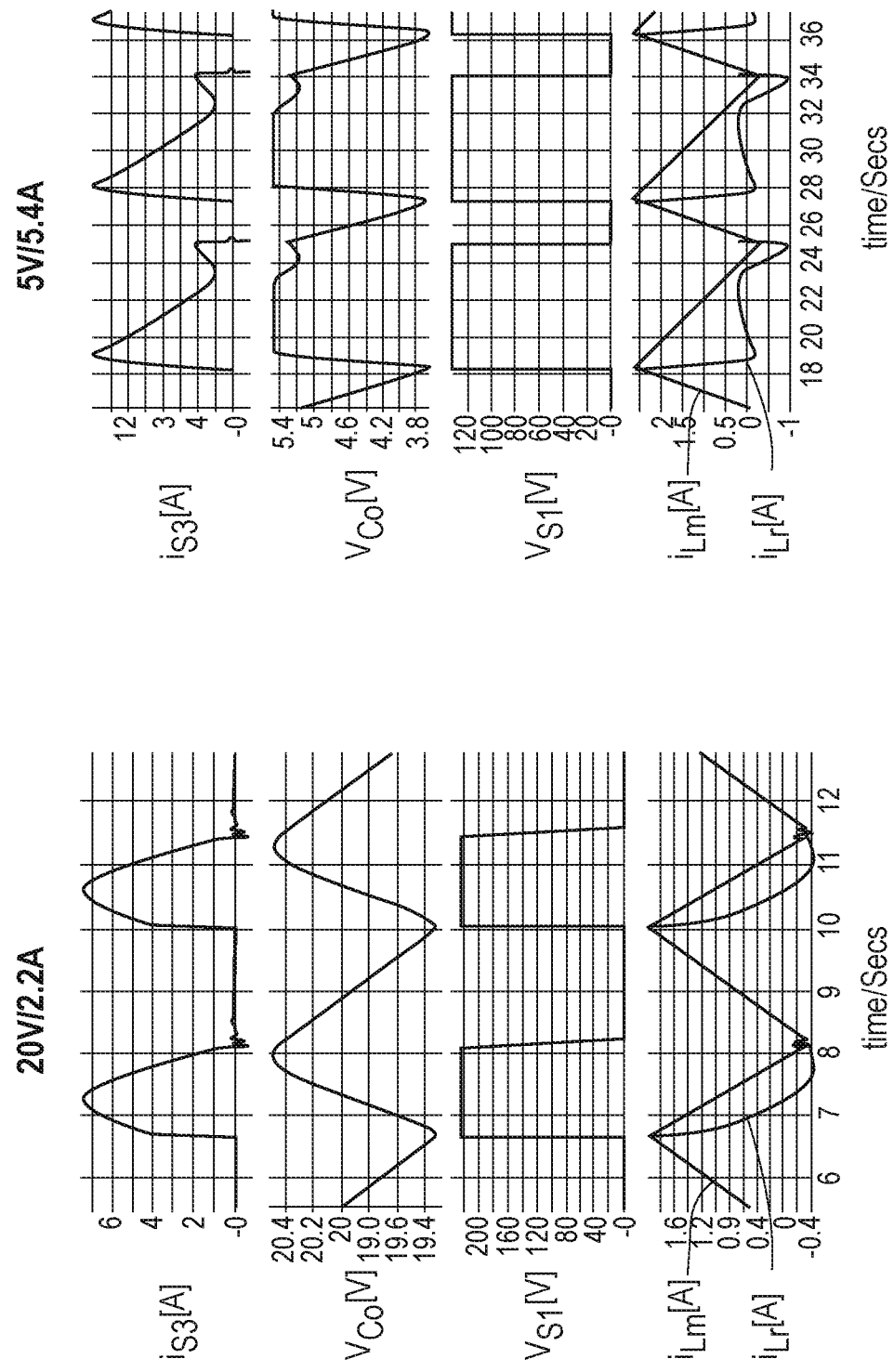
FIG. 22 is a set of waveform diagrams showing operation of an output clamped converter with a secondary resonant capacitor at two different output voltages according to some embodiments.

The secondary-resonant ACF waveforms generated during operation of the circuit of FIG. 21 are shown in FIG. 22 for each of output conditions 20 V/2.2 A and 5 V/5.4 A. The operation during the switch S1 ON interval is the same as the embodiments above without clamping of the voltage at output capacitor Co, such as that illustrated in FIG. 5. When switch S1 is turned off, the iLr current drops to a lower value due to the current dividing effect depending on the ratio of the primary switch Coss to the secondary switch output capacitance Cj. When the commutation of switches S1, S2, and S3 is completed, Lr starts to resonate with the output capacitor Co and clamping capacitor Cr.

As shown in FIG. 22, at the output condition 5 V/5.4 A, the voltage across the output capacitor Co ($V_{Co}$[V]), is clamped by diode D1 at about 5.5 V, which is about the voltage across the output capacitor Co plus the threshold voltage of diode D1. In some embodiments, the threshold voltage parameter of diode D1 may be selected so as to select the voltage at which the voltage across output capacitor Co is clamped. In some embodiments, diode D1 may comprise multiple diodes serially connected.

The charge which would otherwise increase the voltage across the output capacitor Co, is shunted by diode D1 directly to the filter capacitor Cob. As a consequence, as comparison of FIGS. 20 and 22 show, for the output condition 5 V/5.4 A, the voltage ripple is significantly reduced. In addition, as shown in FIG. 22, the rectification switch S3 turns on only once during each period.

In some embodiments diode D1 is a P-N junction diode. In alternative embodiments, diode D1 is a FET having a gate terminal electrically connected with a drain terminal, as understood by those of skill in the art.

Figure 23:
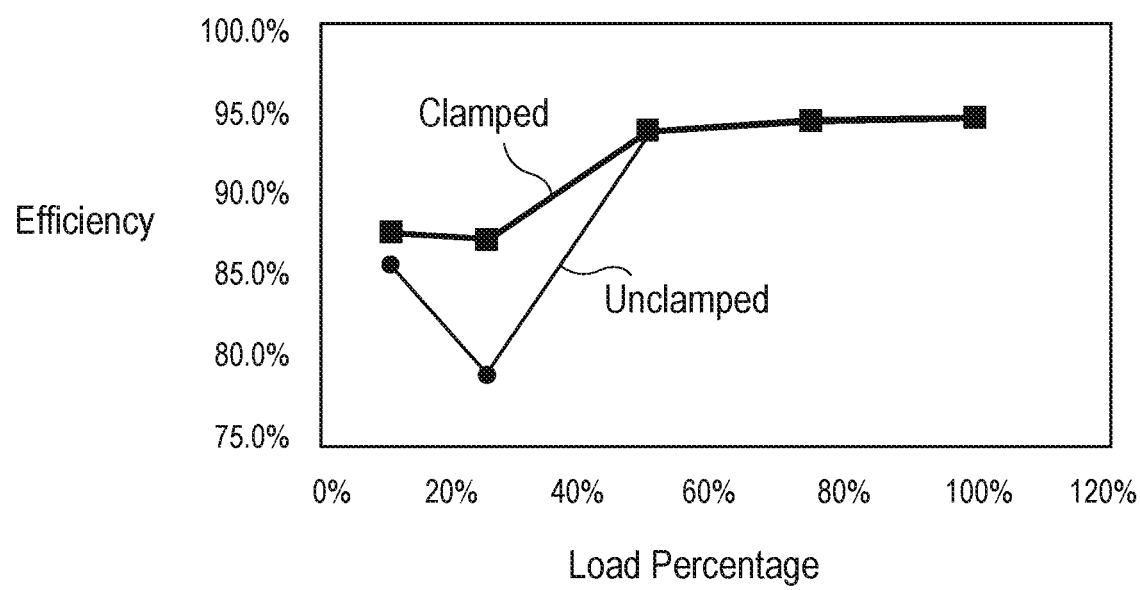
FIG. 23 illustrates a graphical comparison of clamped and unclamped output converter efficiency performance according to some embodiments.

FIG. 23 illustrates a graphical comparison of clamped and unclamped output converter efficiency performance according to some embodiments. As shown, for lower load percentages, the efficiency of the circuit is significantly improved. In addition, for higher load percentages the efficiency of the circuit is not reduced.

Figure 24:
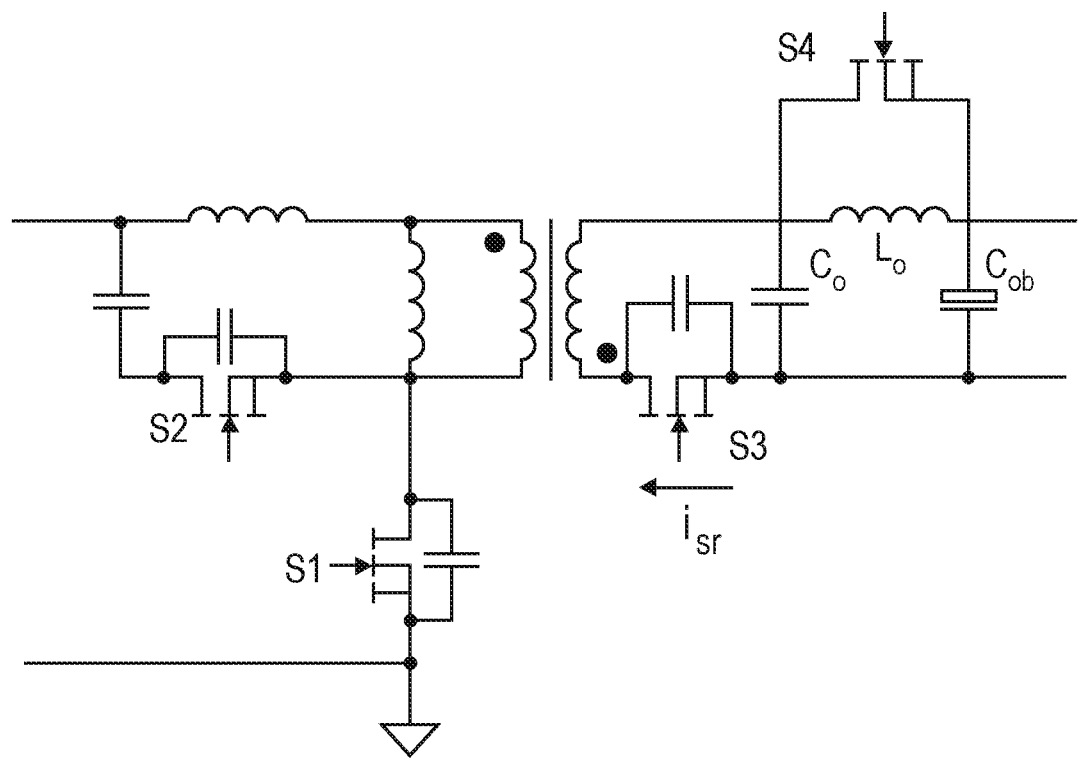
FIG. 24 is a schematic illustration of another embodiment of an output clamped converter.

FIG. 24 is a schematic illustration of another embodiment of an output clamped converter. In this embodiment, switch S4 has a drain and a source connected across inductor Lo, as illustrated. In this embodiment, the voltage across the output capacitor Co, is clamped by switch S4 to the voltage across the filter capacitor Cob while switch S4 is conductive. While the voltage across the output capacitor Co is clamped, charge which would otherwise increase the voltage across the output capacitor Co, is shunted by diode D1 directly to the filter capacitor Cob. In some embodiments, switch S4 is a PMOS FET. In alternative embodiments, switch S4 is an NMOS FET.

Figure 25:
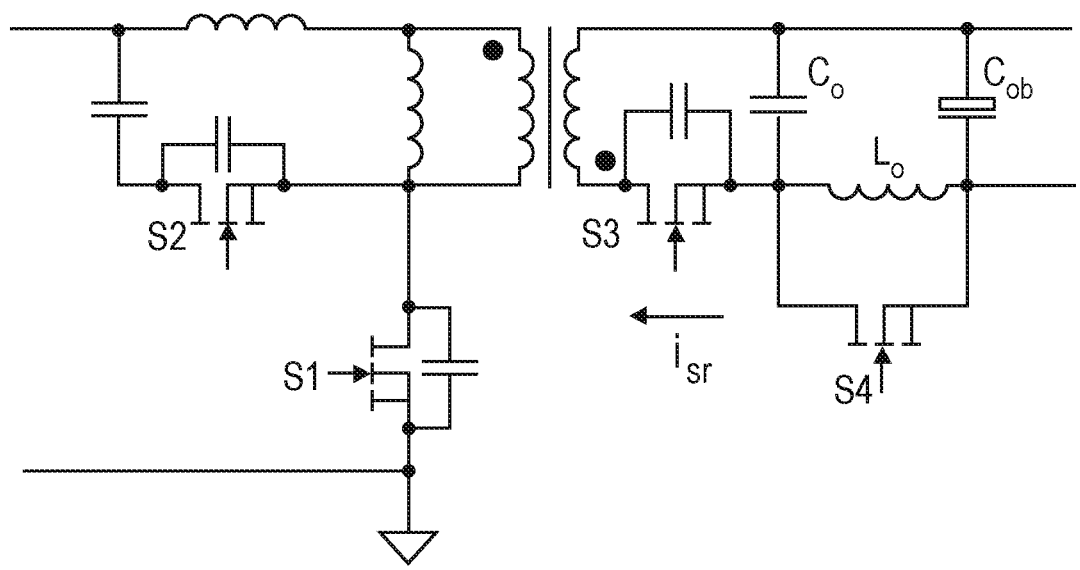
FIG. 25 is a schematic illustration of another embodiment of an output clamped converter.

FIG. 25 is a schematic illustration of another embodiment of an output clamped converter. In this embodiment, switch S4 has a drain and a source connected across inductor Lo, as illustrated. In this embodiment, the voltage across the output capacitor Co, is clamped by switch S4 to the voltage across the filter capacitor Cob while switch S4 is conductive. While the voltage across the output capacitor Co is clamped, charge which would otherwise increase the voltage across the output capacitor Co, is shunted by diode D1 directly to the filter capacitor Cob. In some embodiments, switch S4 is a PMOS FET. In alternative embodiments, switch S4 is an NMOS FET.

Figure 26:
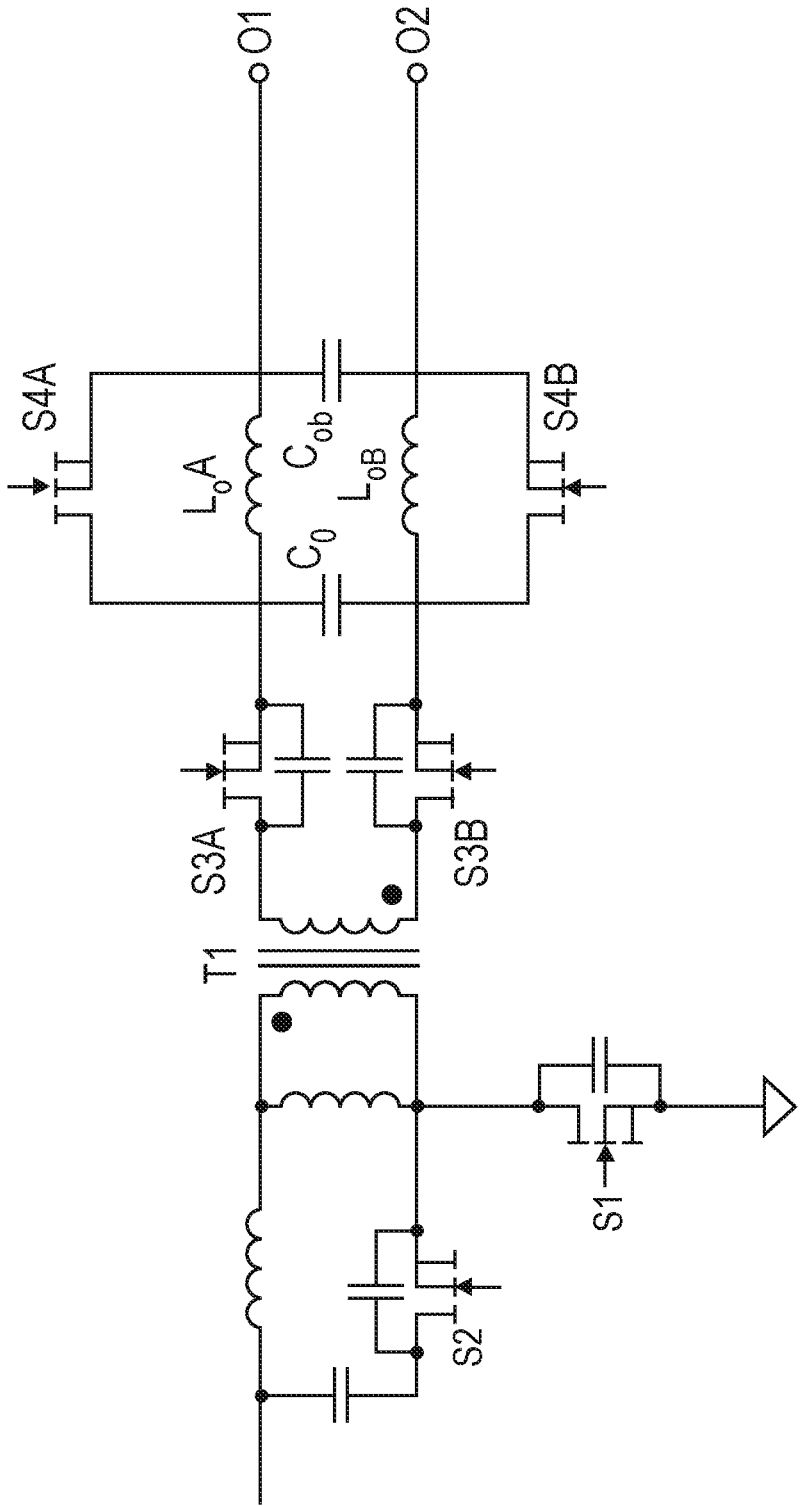
FIG. 26 is a schematic illustration of another embodiment of an output clamped converter.

FIG. 26 is a schematic illustration of another embodiment of an output clamped converter. In this embodiment, each of the components between the terminals of the secondary side of the transformer T1 and the output terminals O1 and O2 are balanced such that parasitic effects are substantially the same on the output terminal O1 side and on the output terminal O2 side. In this embodiment, the synchronous rectifier switch S3 is formed by first and second synchronous rectifier switches S3A and S3B. In this embodiment, clamping switch S4 is formed by first and second clamping switches S4A and S4B. In this embodiment LC inductor Lo is formed by first and second LC inductors LoA and LoB.

In alternative embodiments, synchronous rectifier switch S3 is not balanced and is formed only on one of the output terminal O1 side and the output terminal O2 side, and one or more of the other components are balanced and, therefore, formed on both of the output terminal O1 side and the output terminal O2 side. In alternative embodiments, clamping switch S4 is not balanced and is formed only on one of the output terminal O1 side and the output terminal O2 side, and one or more of the other components are balanced and, therefore, formed on both of the output terminal O1 side and the output terminal O2 side. In alternative embodiments, LC inductor Lo is not balanced and is formed only on one of the output terminal O1 side and the output terminal O2 side, and one or more of the other components are balanced and, therefore, formed on both of the output terminal O1 side and the output terminal O2 side.

In the embodiment of FIG. 26, switch S4A has a drain and a source connected across clamping diode D1A, and switch S4B has a drain and a source connected across clamping diode D1B, as illustrated. In this embodiment, the voltage across the output capacitor Co, is clamped by clamping switches S4A and S4B to the voltage across the filter capacitor Cob while clamping switches S4A and S4B are conductive. While the voltage across the output capacitor Co is clamped, charge which would otherwise increase the voltage across the output capacitor Co, is shunted by clamping switches S4A and S4B directly to the filter capacitor Cob. In some embodiments, one or more of switches S3A, S3B, S4A, and S4B is a PMOS FET. In alternative embodiments, one or more of switches S3A, S3B, S4A, and S4B is an NMOS FET.

Figure 27:
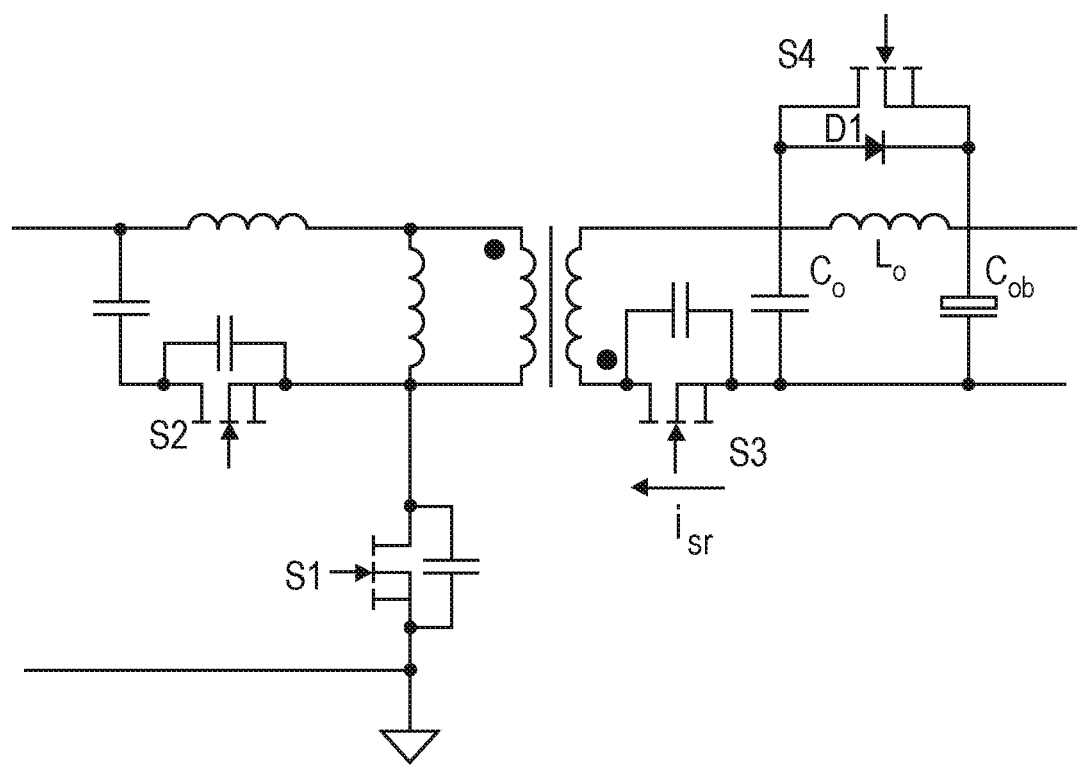
FIG. 27 is a schematic illustration of another embodiment of an output clamped converter.

FIG. 27 is a schematic illustration of another embodiment of an output clamped converter. In this embodiment, switch S4 has a drain and a source connected across diode D1, as illustrated. In this embodiment, the voltage across the output capacitor Co, is clamped by diode D1 to the voltage across the filter capacitor Cob plus the threshold voltage of diode D1. In addition, the voltage across the output capacitor Co, is clamped by switch S4 to the voltage across the filter capacitor Cob while switch S4 is conductive. While the voltage across the output capacitor Co is clamped, charge which would otherwise increase the voltage across the output capacitor Co, is shunted by diode D1 or switch S4 directly to the filter capacitor Cob. In some embodiments, switch S4 is a PMOS FET. In alternative embodiments, switch S4 is an NMOS FET.

Figure 28:
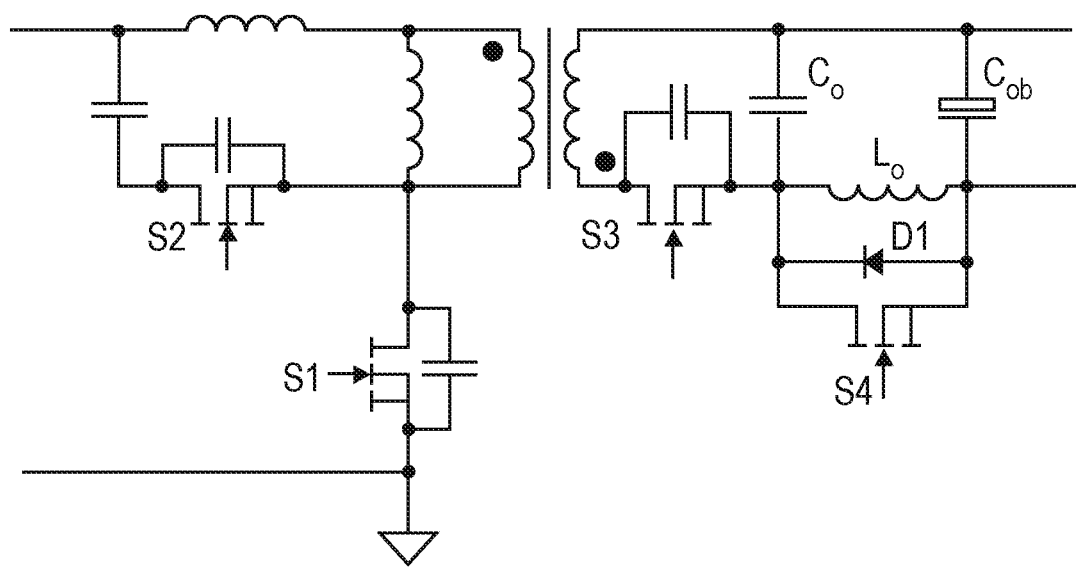
FIG. 28 is a schematic illustration of another embodiment of an output clamped converter.

FIG. 28 is a schematic illustration of another embodiment of an output clamped converter. In this embodiment, switch S4 has a drain and a source connected across diode D1, as illustrated. In this embodiment, the voltage across the output capacitor Co, is clamped by diode D1 to the voltage across the filter capacitor Cob plus the threshold voltage of diode D1. In addition, the voltage across the output capacitor Co, is clamped by switch S4 to the voltage across the filter capacitor Cob while switch S4 is conductive. While the voltage across the output capacitor Co is clamped, charge which would otherwise increase the voltage across the output capacitor Co, is shunted by diode D1 or switch S4 directly to the filter capacitor Cob. In some embodiments, switch S4 is a PMOS FET. In alternative embodiments, switch S4 is an NMOS FET.

Figure 29:
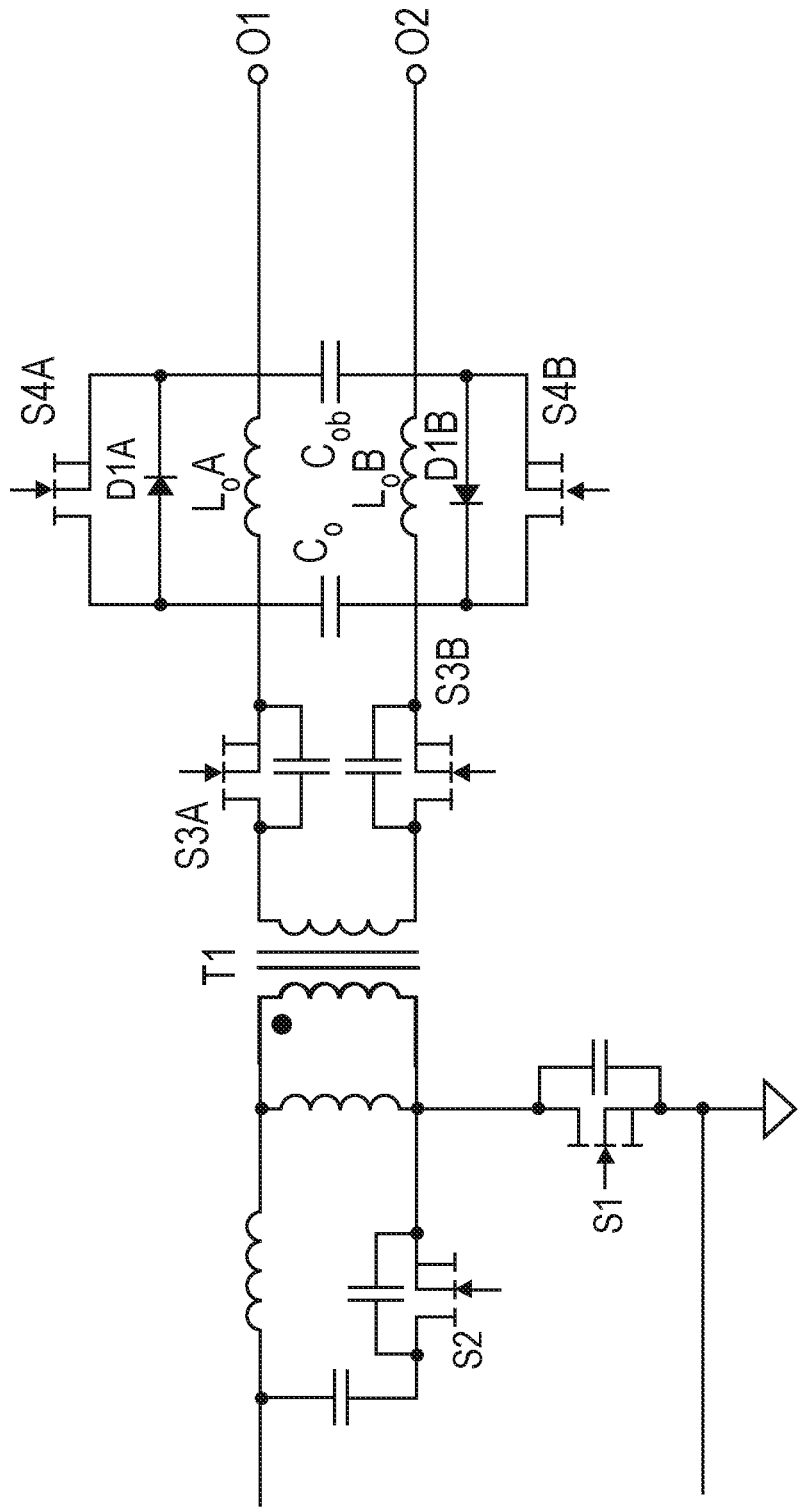
FIG. 29 is a schematic illustration of another embodiment of an output clamped converter.

FIG. 29 is a schematic illustration of another embodiment of an output clamped converter. In this embodiment, each of the components between the terminals of the secondary side of the transformer T1 and the output terminals O1 and O2 are balanced such that parasitic effects are substantially the same on the output terminal O1 side and on the output terminal O2 side. In this embodiment, the synchronous rectifier switch S3 is formed by first and second synchronous rectifier switches S3A and S3B. In this embodiment, clamping switch S4 is formed by first and second clamping switches S4A and S4B. In this embodiment, clamping diode D1 is formed by first and second clamping diodes D1A and D1B. In this embodiment LC inductor Lo is formed by first and second LC inductors LoA and LoB.

In alternative embodiments, synchronous rectifier switch S3 is not balanced and is formed only on one of the output terminal O1 side and the output terminal O2 side, and one or more of the other components are balanced and, therefore, formed on both of the output terminal O1 side and the output terminal O2 side. In alternative embodiments, clamping switch S4 is not balanced and is formed only on one of the output terminal O1 side and the output terminal O2 side, and one or more of the other components are balanced and, therefore, formed on both of the output terminal O1 side and the output terminal O2 side. In alternative embodiments, clamping diode D1 is not balanced and is formed only on one of the output terminal O1 side and the output terminal O2 side, and one or more of the other components are balanced and, therefore, formed on both of the output terminal O1 side and the output terminal O2 side. In alternative embodiments, LC inductor Lo is not balanced and is formed only on one of the output terminal O1 side and the output terminal O2 side, and one or more of the other components are balanced and, therefore, formed on both of the output terminal O1 side and the output terminal O2 side.

In the embodiment of FIG. 29, switch S4A has a drain and a source connected across clamping diode D1A, and switch S4B has a drain and a source connected across clamping diode D1B, as illustrated. In this embodiment, the voltage across the output capacitor Co, is clamped by clamping diodes D1A and D1B to the voltage across the filter capacitor Cob plus the threshold voltage of clamping diodes D1A and D1B. In addition, the voltage across the output capacitor Co, is clamped by clamping switches S4A and S4B to the voltage across the filter capacitor Cob while clamping switches S4A and S4B are conductive. While the voltage across the output capacitor Co is clamped, charge which would otherwise increase the voltage across the output capacitor Co, is shunted by clamping diodes D1A and D1B or clamping switches S4A and S4B directly to the filter capacitor Cob. In some embodiments, one or more of switches S3A, S3B, S4A, and S4B is a PMOS FET. In alternative embodiments, one or more of switches S3A, S3B, S4A, and S4B is an NMOS FET.

Figure 30:
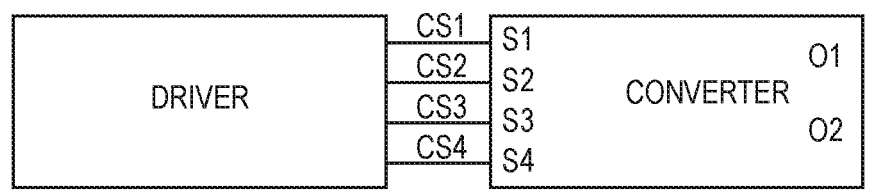
FIG. 30 is a schematic illustration of a driver circuit electrically connected to a converter circuit according to some embodiments.

FIG. 30 is a schematic illustration of a driver circuit 3010 electrically connected to a converter circuit 3020 according to some embodiments.

Driver circuit 3010 generates control signals CS1, CS2, optionally CS3, and optionally CS4 according to signals received (not shown).

Converter circuit 3020 may have features similar or identical to one or more of the converter circuits discussed herein. Converter circuit 3020 receives the control signals CS1, CS2, optionally CS3, and optionally CS4, which cause corresponding switches S1, S2, S3 (if used), and S4 (if used) to generate a substantially fixed output voltage across output terminals O1 and O2.

Figure 31:
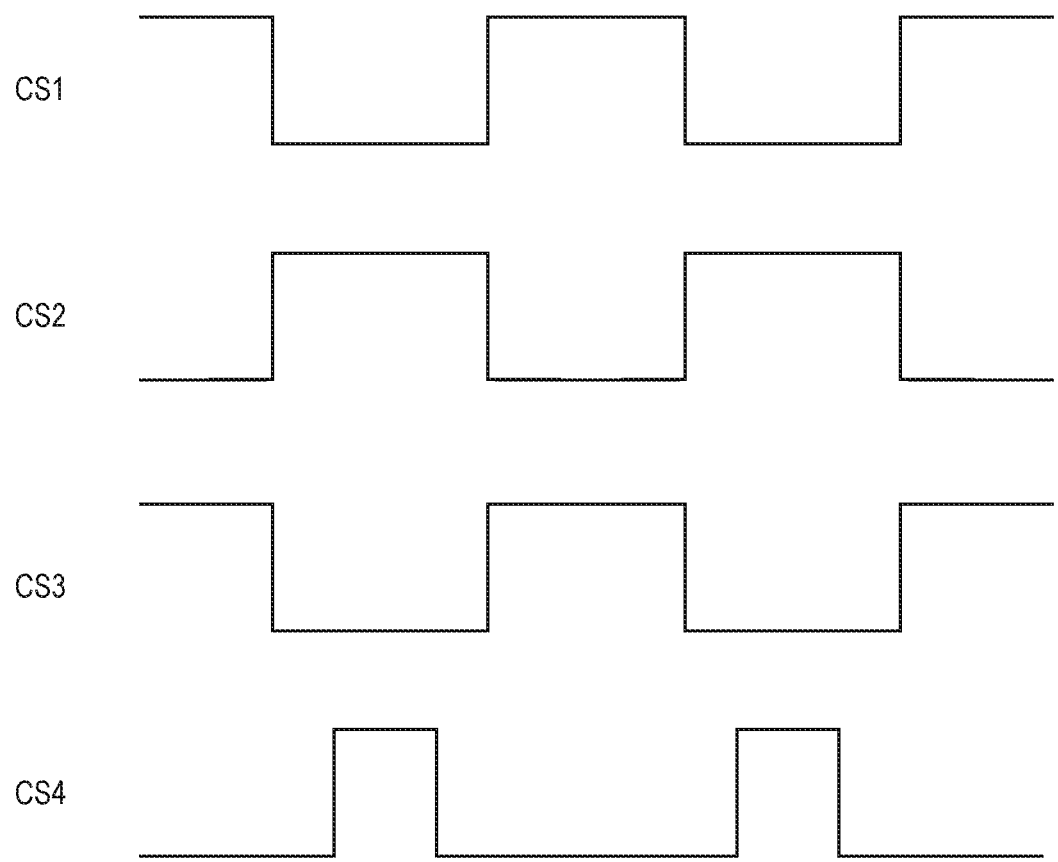
FIG. 31 is a waveform diagram illustrating an embodiment of signals generated by the driver circuit of FIG. 30 for the converter circuit of FIG. 30.

FIG. 31 is a waveform diagram illustrating an embodiment of control signals CS1, CS2, CS3, and CS4 generated by the driver circuit of FIG. 30 for the converter circuit of FIG. 30.

Control signals CS1 and CS2 are used to operate the primary side circuit connected to the primary side of the transistor of the converter circuit, as understood by those of skill in the art.

Control signal CS3, if needed, controls the conductivity state of a synchronous rectification switch S3, if used, as understood by those of skill in the art.

Control signal CS4, if needed, controls the conductivity state of a clamping switch S4, if used, as described herein. In the embodiment of FIG. 31, control signal CS4 being high causes the clamping switch S4 to be conductive, and control signal CS4 being low causes the clamping switch S4 to be nonconductive.

In some embodiments, the driver circuit 3010 is configured to cause control signal CS4 to become high in response to a signal received signal indicating that the voltage across output capacitor Co is greater than a threshold. For example, in some embodiments the driver circuit 3010 is configured to cause control signal CS4 to become high in response to a signal indicating that the voltage across output capacitor Co is greater than the voltage across filter capacitor Cob. In alternative embodiments, the driver circuit 3010 is configured to cause control signal CS4 to become high in response to a signal indicating that the voltage across output capacitor Co is greater than the voltage across filter capacitor Cob by at least a particular voltage value.

In some embodiments, the driver circuit 3010 is configured to cause control signal CS4 to become high at a predetermined time during each cycle. For example, the driver circuit 2010 may be configured to cause control signal CS4 to become high a predetermined time after a transition in one of control signals CS1 and CS2.

In some embodiments, the driver circuit 3010 is configured to cause control signal CS4 to become high in response to a signal indicating charge or power or energy flow from output capacitor Co to filter capacitor Cob.

In some embodiments, the driver circuit 3010 is configured to cause control signal CS4 to become low in response to a signal received signal indicating that the voltage across output capacitor Co is less than a threshold. For example, in some embodiments the driver circuit 3010 is configured to cause control signal CS4 to become low in response to a signal indicating that the voltage across output capacitor Co is less than the voltage across filter capacitor Cob. In alternative embodiments, the driver circuit 3010 is configured to cause control signal CS4 to become low in response to a signal indicating that the voltage across output capacitor Co is less than the voltage across filter capacitor Cob by at least a particular voltage value.

In some embodiments, the driver circuit 3010 is configured to cause control signal CS4 to become low at a predetermined time during each cycle. For example, the driver circuit 2010 may be configured to cause control signal CS4 to become low a predetermined time after a transition in one of control signals CS1 and CS2.

In some embodiments, the driver circuit 3010 is configured to cause control signal CS4 to become low at a predetermined time after control signal CS4 became high, such that the high time of control signal CS4 is substantially constant across multiple periods.

In some embodiments, the driver circuit 3010 is configured to cause control signal CS4 to become low in response to a signal indicating charge or power or energy flow to output capacitor Co from filter capacitor Cob.

In some embodiments, control signals CS1, CS2, and optionally CS3 cause a converter circuit, such as those discussed herein, to generate signals such as those illustrated in FIG. 22.

In some embodiments, control signals CS1, CS2, optionally CS3, and CS4 cause a converter circuit, such as those discussed herein, to generate signals similar to those illustrated in FIG. 22, where the voltage across the output capacitor Co is clamped to the voltage across the filter capacitor Cob instead of being clamped to the voltage across the filter capacitor Cob plus a threshold.

In some embodiments the driver circuit 3010 is configured to operate converter circuit 3020 in a burst mode, such that the control signals CS1, CS2, optionally CS3, and optionally CS4 are active during an active time period, and are inactive during an inactive time period. In such embodiments, a clamping switch may be advantageously used.

FIGS. 32A and 32B are waveform diagrams illustrating operation of a converter in burst mode without and with use of a clamping switch during the inactive time period. The BURST signal indicates whether the converter is operating during an active time period or during an inactive time period.

Accordingly, as shown, while the BURST signal is high, the converter operates during an active time period, and the voltage at switch node $V_{S1}$ switches in response to the control signals CS1 and CS2. Conversely, as shown, while the BURST signal is low, the converter operates during an inactive time period, and the voltage at switch node $V_{S1}$ switches does not switch in response to the control signals CS1 and CS2, but instead oscillates according to the inductances, capacitances, and resistances of the circuit.

FIG. 32A illustrates operation of the converter in burst mode without use of a clamping switch during the inactive time period. As shown, while the BURST signal is low and the converter operates during an inactive time period with the voltage at switch node $V_{S1}$ oscillating. In addition, because the voltage at the output capacitor $V_{Co}$ is not clamped during the inactive time period, the voltage at the output capacitor $V_{Co}$ oscillates according to the inductances, capacitances, and resistances of the circuit, as shown in FIG. 32A. As understood by those of skill in the art, such oscillation causes power loss at least in the output inductor, and in some circumstances may additionally cause unstable operation.

FIG. 32B illustrates operation of the converter in burst mode with use of a clamping switch during the inactive time period. As shown, while the BURST signal is low and the converter operates during an inactive time period with the voltage at switch node $V_{S1}$ oscillating. In addition, in response to the BURST signal being low, driver circuit 3010 generates a control signal CS4 which causes clamping switch S4 to be conductive, and the voltage across the output capacitor $V_{Co}$ is clamped to the voltage across filter capacitor $V_{Cob}$. Therefore, during the inactive time period, the voltage across the output capacitor $V_{Co}$ does not oscillate, as shown in FIG. 32B.

In some embodiments, in response to the BURST signal being high, driver circuit 3010 generates a control signal CS4 which causes clamping switch S4 to be nonconductive. In alternative embodiments, in response to the BURST signal being high, driver circuit 3010 generates a control signal CS4 similar or identical to that described above with reference to FIGS. 30 and 31.

Though the present invention is disclosed by way of specific embodiments as described above, those embodiments are not intended to limit the present invention. Based on the methods and the technical aspects disclosed above, variations and changes may be made to the presented embodiments by those skilled in the art without departing from the spirit and the scope of the present invention.

What is claimed is:

1. A converter circuit, comprising:
   an input node;
   an output node;
   a transformer having a primary side and a secondary side;
   a primary circuit connected to the primary side of the transformer, wherein the primary circuit comprises:
      a first switch connected to a ground,
      a second switch connected to the first switch, and
      a clamping capacitor connected to the second switch and to the input node; and
   a secondary circuit connected to the secondary side of the transformer, wherein the secondary circuit comprises:
      a secondary capacitor configured to receive current from the secondary side of the transformer,
      an inductor comprising first and second inductor terminals, wherein one of the first and second inductor terminals is connected to the secondary capacitor, and
      a bypass element comprising first and second bypass terminals respectively connected to the first and second inductor terminals.

2. The converter circuit of claim 1, wherein the bypass element is configured to become conductive so as to conduct current to the output node during a time when a voltage across the secondary capacitor is greater than a threshold voltage.

3. The converter circuit of claim 2, wherein the bypass element comprises a diode having an anode connected to the secondary capacitor.

4. The converter circuit of claim 2, wherein the bypass element comprises a switch.

5. The converter circuit of claim 2, wherein the bypass element comprises a switch in parallel with a diode.

6. The converter circuit of claim 2, wherein the bypass element comprises a diode having a cathode connected to the secondary capacitor.

7. The converter circuit of claim 6, wherein the bypass element comprises a switch in parallel with the diode.

8. The converter circuit of claim 1, wherein the secondary circuit further comprises a rectifying element, and wherein the rectifying element comprises a diode.

9. The converter circuit of claim 1, wherein a second of the first and second inductor terminals is connected to an output capacitor.

10. The converter circuit of claim 1, wherein the bypass element is configured to become conductive during a time when the primary circuit is inactive.

11. A method of operating a converter circuit, the converter circuit comprising:
an input node;
an output node;
a transformer having a primary side and a secondary side;
a primary circuit connected to the primary side of the transformer, wherein the primary circuit comprises:
  a first switch connected to a ground,
  a second switch connected to the first switch, and
  a clamping capacitor connected to the second switch and to the input node; and
a secondary circuit connected to the secondary side of the transformer, wherein the secondary circuit comprises:
  a secondary capacitor configured to receive current from the secondary side of the transformer,
  a filter inductor comprising first and second inductor terminals, wherein the first inductor terminal is connected to the secondary capacitor,
  a filter capacitor connected to the filter inductor, wherein the second inductor terminal is connected to the filter capacitor, and
  a bypass element comprising first and second bypass terminals respectively connected to the first and second inductor terminals,
the method comprising:
conducting current with the bypass element in parallel with the filter inductor.

12. The method of claim 11, further comprising causing the bypass element to become conductive in response to a voltage across the secondary capacitor being greater than a voltage across the filter capacitor by at least a threshold.

13. The method of claim 11, further comprising causing the bypass element to become conductive after a predetermined time duration after one of the first and second switches becomes conductive or becomes nonconductive.

14. The method of claim 11, further comprising causing the bypass element to become conductive in response to a current being conducted from the secondary capacitor to the filter capacitor.

15. The method of claim 11, further comprising causing the bypass element to become nonconductive in response to a voltage across the secondary capacitor being less than a voltage across the filter capacitor by at least a threshold.

16. The method of claim 11, further comprising causing the bypass element to become nonconductive after a predetermined time duration after one of the first and second switches becomes conductive or becomes nonconductive.

17. The method of claim 11, further comprising causing the bypass element to become nonconductive after a predetermined time duration after the bypass element becomes conductive.

18. The method of claim 11, further comprising causing the bypass element to become nonconductive in response to a current being conducted from the filter capacitor to the secondary capacitor.

19. The method of claim 18, wherein the bypass element further comprises a switch in parallel with a diode.

20. The method of claim 11, wherein the bypass element is configured to become conductive during a time when the primary circuit is inactive.

* * * * *